(12) United States Patent
Seo

(10) Patent No.: US 10,841,117 B2
(45) Date of Patent: Nov. 17, 2020

(54) METHOD FOR PERFORMING FEEDBACK BY TERMINAL IN WIRELESS COMMUNICATION SYSTEM AND APPARATUS THEREFOR

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/566,083

(22) PCT Filed: Apr. 15, 2016

(86) PCT No.: PCT/KR2016/003958
§ 371 (c)(1),
(2) Date: Oct. 12, 2017

(87) PCT Pub. No.: WO2016/167606
PCT Pub. Date: Oct. 20, 2016

(65) Prior Publication Data
US 2018/0115430 A1 Apr. 26, 2018

Related U.S. Application Data

(60) Provisional application No. 62/148,151, filed on Apr. 15, 2015, provisional application No. 62/148,153, filed on Apr. 15, 2015.

(51) Int. Cl.
*H04L 1/00* (2006.01)
*H04L 1/18* (2006.01)
(Continued)

(52) U.S. Cl.
CPC .......... *H04L 12/189* (2013.01); *H04L 1/0026* (2013.01); *H04L 1/0073* (2013.01); *H04L 1/12* (2013.01); *H04L 1/1671* (2013.01); *H04L 1/1854* (2013.01); *H04L 1/1861* (2013.01); *H04L 5/0055* (2013.01); *H04W 72/0413* (2013.01); *H04W 74/0833* (2013.01);
(Continued)

(58) Field of Classification Search
CPC combination set(s) only.
See application file for complete search history.

(56) References Cited

U.S. PATENT DOCUMENTS

2008/0049749 A1 2/2008 Xiao et al.
2010/0172281 A1* 7/2010 Hus ..................... H04L 1/1607
370/312
(Continued)

OTHER PUBLICATIONS

Acer Incorporated, "MBMS counting procedure for the UE in idle mode," R2-143094, 3GPP TSG RAN WG2 #87, Aug. 18 to 22, 2014, Dresden, Germany, 2 pages.

*Primary Examiner* — Kodzovi Acolatse
*Assistant Examiner* — The Hy Nguyen
(74) *Attorney, Agent, or Firm* — Dentons US LLP

(57) ABSTRACT

According to an embodiment of the present invention, a method for performing a feedback for an evolved-multimedia broadcast multicast service (E-MBMS) by a terminal in a wireless communication system may comprise the steps of: receiving the E-MBMS from a base station; and transmitting feedback information for the E-MBMS in an uplink subframe, wherein the terminal operates in an RRC idle state.

9 Claims, 18 Drawing Sheets

(51) Int. Cl.

| | |
|---|---|
| *H04W 72/04* | (2009.01) |
| *H04W 74/08* | (2009.01) |
| *H04L 12/18* | (2006.01) |
| *H04L 1/12* | (2006.01) |
| *H04W 76/40* | (2018.01) |
| *H04L 1/16* | (2006.01) |
| *H04W 88/02* | (2009.01) |
| *H04W 76/27* | (2018.01) |
| *H04L 5/00* | (2006.01) |
| *H04W 72/00* | (2009.01) |
| *H04W 88/08* | (2009.01) |

(52) U.S. Cl.
CPC ........... *H04W 76/27* (2018.02); *H04W 76/40* (2018.02); *H04W 88/02* (2013.01); *H04L 1/0031* (2013.01); *H04L 2001/0093* (2013.01); *H04W 72/005* (2013.01); *H04W 88/08* (2013.01)

(56) References Cited

U.S. PATENT DOCUMENTS

| | | | |
|---|---|---|---|
| 2010/0296472 A1* | 11/2010 | Lee | H04L 1/0026 370/329 |
| 2012/0099419 A1* | 4/2012 | Kim | H04L 1/1854 370/216 |
| 2013/0070660 A1 | 3/2013 | Xu | |
| 2014/0098721 A1* | 4/2014 | Chen | H04W 72/005 370/280 |
| 2014/0126520 A1* | 5/2014 | Quan | H04W 74/0866 370/329 |
| 2014/0185455 A1 | 7/2014 | Balasubramanian et al. | |
| 2014/0241318 A1 | 8/2014 | Zhong et al. | |
| 2014/0362757 A1* | 12/2014 | Chang | H04W 76/40 370/312 |
| 2017/0013422 A1* | 1/2017 | Saiwai | H04W 4/06 |
| 2017/0048879 A1* | 2/2017 | Zhang | H04W 52/146 |
| 2017/0111934 A1* | 4/2017 | Wang | H04W 76/10 |
| 2017/0325277 A1* | 11/2017 | Fujishiro | H04W 4/06 |
| 2018/0131458 A1* | 5/2018 | Fukuta | H04H 20/57 |
| 2018/0249481 A1* | 8/2018 | Xu | H04L 1/1896 |

* cited by examiner

FIG. 3
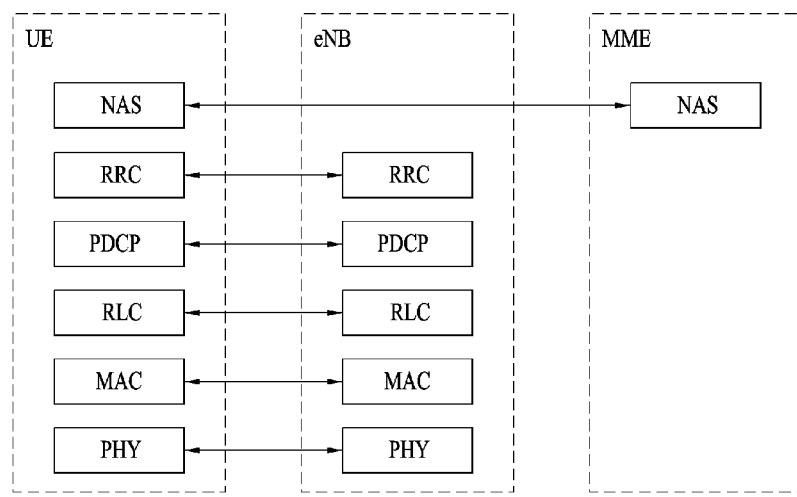
(a) Control-plane protocol stack
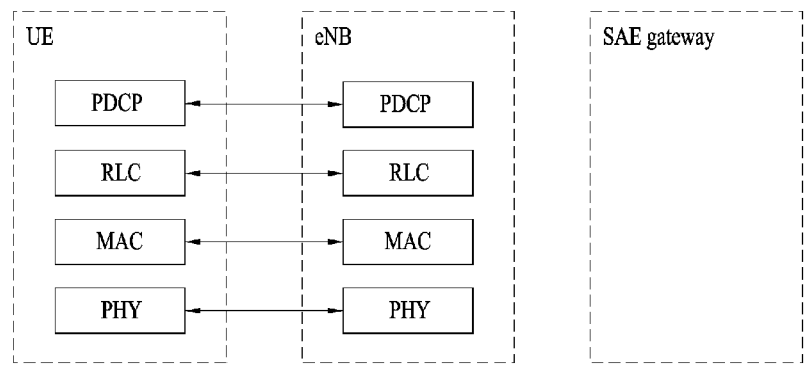
(b) User-plane protocol stack PUCCH format 1a and 1b structure (normal CP case)

PUCCH format 2,2a and 2b structure (normal CP case)

Reserved for multicast/broadcast

Reserved for multicast/broadcast

METHOD FOR PERFORMING FEEDBACK BY TERMINAL IN WIRELESS COMMUNICATION SYSTEM AND APPARATUS THEREFOR

This application is a 35 USC § 371 National Stage entry of International Application No. PCT/KR2016/003958 filed on Apr. 15, 2016, and claims priority to U.S. Provisional Application Nos. 62/148,151 filed on Apr. 15, 2015 and 62/148,153 filed on Apr. 15, 2015, all of which are hereby incorporated by reference in their entireties as if fully set forth herein.

TECHNICAL FIELD

The present invention relates to a wireless communication system, and more particularly, to a method for performing feedback by a user equipment in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the above-described discussion, the present invention proposes a method for transmitting a feedback signal by a user equipment in a wireless communication system.

Technical Solutions

In an aspect of the present invention, provided herein is a method for performing feedback for Evolved-Multimedia Broadcast Multicast Service (E-MBMS) by a user equipment (UE) in a wireless communication system, including: receiving the E-MBMS from a base station (BS); and transmitting feedback information on the E-MBMS in an uplink subframe. In this case, the UE may be in a radio resource control (RRC) idle state.

Here, the feedback information may include at least one of ACK/NACK information on the E-MBMS and channel state information.

In this case, the uplink subframe may be transmitted using downlink reception timing.

Additionally, the feedback information may be transmitted using a physical uplink shared channel (PUSCH) format or a physical uplink control channel (PUCCH) format.

The feedback information may be transmitted with a frequency gap from a PUSCH or a PUCCH transmitted by a different UE in an RRC connected state.

A cyclic prefix (CP) length of the uplink subframe may be set to a value different from that of a subframe in which the different UE transmits the PUSCH or the PUCCH.

The feedback information may be transmitted in a physical random access channel (PRACH) preamble.

Preferably, a sequence of the PRACH preamble in which the feedback information is transmitted may be associated with the feedback information.

Additionally, a resource for the PRACH preamble in which the feedback information is transmitted may be associated with the feedback information.

In this case, the resource for the PRACH preamble associated with the feedback information may be a single time-frequency resource.

Alternatively, the feedback information may be associated with a plurality of time-frequency resources, and the resource for the PRACH preamble may be selected from among the plurality of time-frequency resources.

The feedback method may further include: transmitting a physical random access channel (PRACH) preamble to the BS using a resource reserved for the feedback; and when a random access response message is received in response to the PRACH preamble, transmitting the feedback.

In another aspect of the present invention, provided herein is a method for receiving feedback for Evolved-Multimedia Broadcast Multicast Service (E-MBMS) by a base station (BS) in a wireless communication system, including: transmitting the E-MBMS to a user equipment (UE); and receiving feedback information on the E-MBMS in an uplink subframe. In this case, the UE may be in a radio resource control (RRC) idle state with respect to the BS.

In still another aspect of the present invention, provided herein is a user equipment (UE) in a wireless communication system, including: a transceiver configured to receive Evolved-Multimedia Broadcast Multicast Service (E-MBMS) from a base station (BS) and transmit feedback information on the E-MBMS in an uplink subframe; and a processor configured to control the transceiver. In this case, the UE may be in a radio resource control (RRC) idle state.

In a further aspect of the present invention, provided herein is a base station (BS) in a wireless communication system, including: a transceiver configured to transmit Evolved-Multimedia Broadcast Multicast Service (E-MBMS) to a user equipment (UE) and receive feedback information on the E-MBMS in an uplink subframe; and a processor configured to control the transceiver. In this case, the UE may be in a radio resource control (RRC) idle state with respect to the BS.

The above technical solutions are merely some parts of the embodiments of the present invention and various embodiments into which the technical features of the present invention are incorporated can be derived and understood by persons skilled in the art from the following detailed description of the present invention.

Advantageous Effects

According to embodiments of the present invention, a network can efficiently provide Evolved Multimedia Broadcast Multicast Service (E-MBMS). Specifically, if a UE transmits feedback information on E-MBMS, an eNB can stably provide the E-MBMS to the UE. In addition, the UE can stably receive the E-MBMS based on a relationship with unicast signals.

Effects obtainable from the present invention are non-limited by the above-mentioned effect. And, other unmentioned effects can be clearly understood from the following description by those having ordinary skill in the technical field to which the present invention pertains.

DESCRIPTION OF DRAWINGS

FIG. 3 is a diagram of structures of control and user planes of a radio interface protocol between a user equipment and E-UTRAN based on 3GPP radio access network specification.

BEST MODE FOR INVENTION

Figure 1:
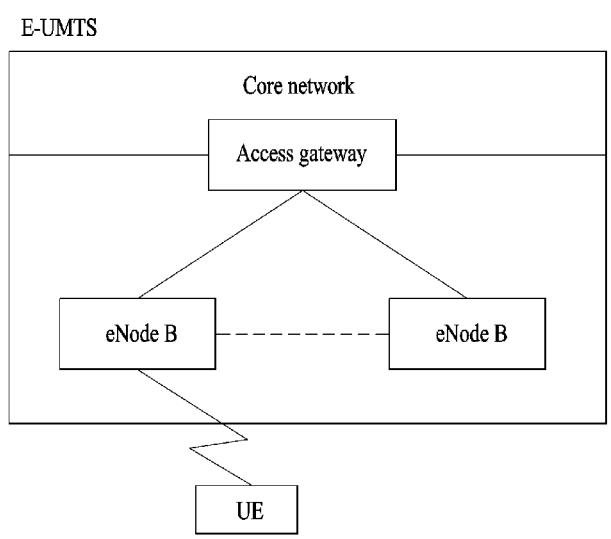
FIG. 1 is a schematic diagram of E-UMTS network structure as an example of a mobile communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s)

of the specific node to the specific node and/or channel state information reference signal(s) (CSI-RS(s)) transmitted on a CSI-RS resource. For details of CSI-RS configuration, see 3GPP TS 36.211 and 3GPP TS 36.331.

Meanwhile, the 3GPP LTE/LTE-A system uses the concept of a cell to manage radio resources, and the cell associated with a radio resource is distinguished from a cell of a geographical area.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

Figure 2:
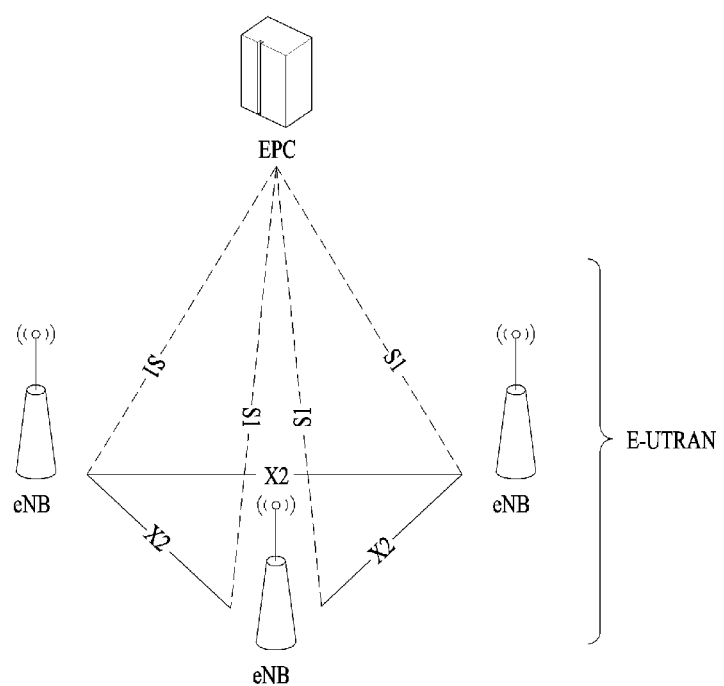
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

A single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
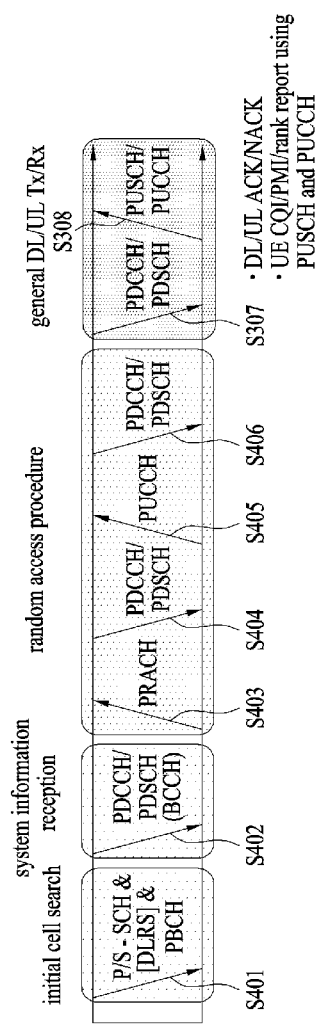
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
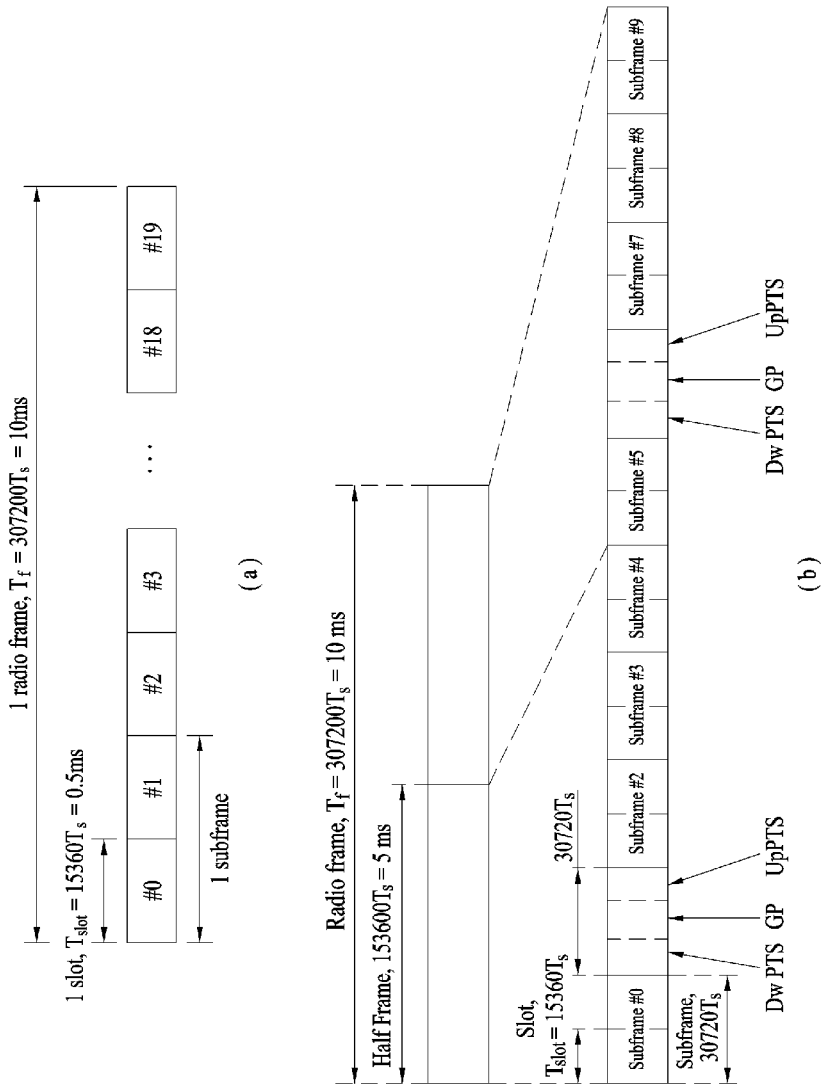
FIG. 5 is a diagram for an example of a structure of a radio frame used for LTE system.

FIG. 5 is a diagram for an example of a structure of a radio frame used by LTE system.

Specifically, FIG. 5($a$) illustrates an exemplary structure of a radio frame which can be used in frequency division multiplexing (FDD) in 3GPP LTE/LTE-A and FIG. 5($b$) illustrates an exemplary structure of a radio frame which can be used in time division multiplexing (TDD) in 3GPP LTE/LTE-A. The frame structure of FIG. 5($a$) is referred to as frame structure type 1 (FS1) and the frame structure of FIG. 5($b$) is referred to as frame structure type 2 (FS2).

Referring to FIG. 5, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

[Table 1] shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. [Table 2] shows an example of the special subframe configuration.

Figure 6:
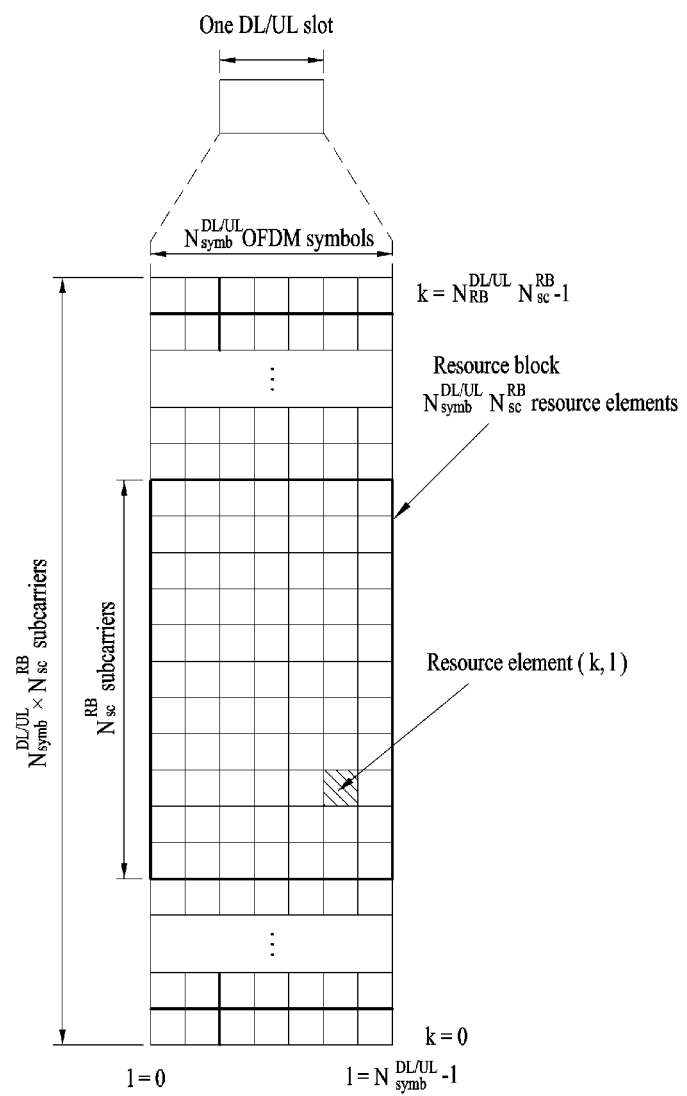
FIG. 6 illustrates the structure of a downlink (DL)/uplink (UL) slot in a wireless communication system.

FIG. 6 illustrates the structure of a DL/UL slot structure in a wireless communication system. In particular, FIG. 6 illustrates the structure of a resource grid of a 3GPP LTE/LTE-A system. One resource grid is defined per antenna port.

Referring to FIG. 6, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 6, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 6 for convenience of description, embodiments of the present invention are similarly applicable to subframes having a different number of OFDM symbols. Referring to FIG. 6, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

More specifically, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting the SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The DL carrier frequency and the corresponding system bandwidth may be acquired by the PBCH, and the UL carrier frequency and the corresponding system bandwidth may be acquired through system information, which is a DL signal. For example, the UE may acquire a SystemInformationBlockType2 (SIB2) and determine the entire UL system band that the UE is allowed to use for UL transmission, through the UL-carrier frequency and UL-bandwidth information in the SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI, etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Figure 7:
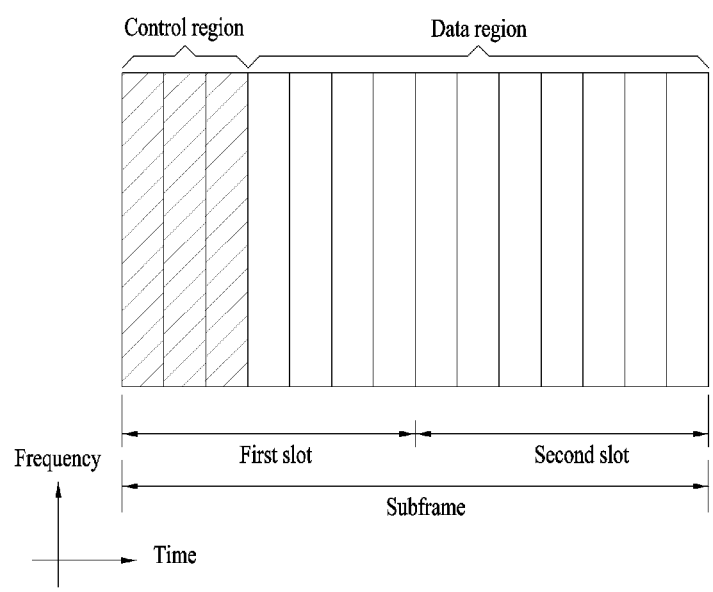
FIG. 7 illustrates the structure of a DL subframe used in a wireless communication system.

FIG. 7 illustrates the structure of a DL subframe used in a wireless communication system.

Referring to FIG. 7, a DL subframe is divided into a control region and a data region in the time domain. Referring to FIG. 7, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Meanwhile, a PDCCH may be additionally allocated in the data region (e.g., a resource region for PDSCH). The PDCCH allocated to the data region is referred to as EPDCCH. As shown, scheduling restriction due to the limited control channel resources of the PDCCH region may be eased by securing additional control channel resources through the EPDCCH. Like the PDCCH, the EPDCCH carries DCI. For example, the EPDCCH may carry downlink scheduling information and uplink scheduling information. For example, the UE may receive the EPDCCH and receive data/control information on a PDSCH corresponding to the EPDCCH. In addition, the UE may receive the EPDCCH and transmit data/control information on the PUSCH corresponding to the EPDCCH. Depending on the cell type, the EPDCCH/PDSCH may be allocated from the first OFDM symbol of the subframe. Unless otherwise specified, the term PDCCH herein is used to represent both PDCCH and EPDCCH.

Figure 8:
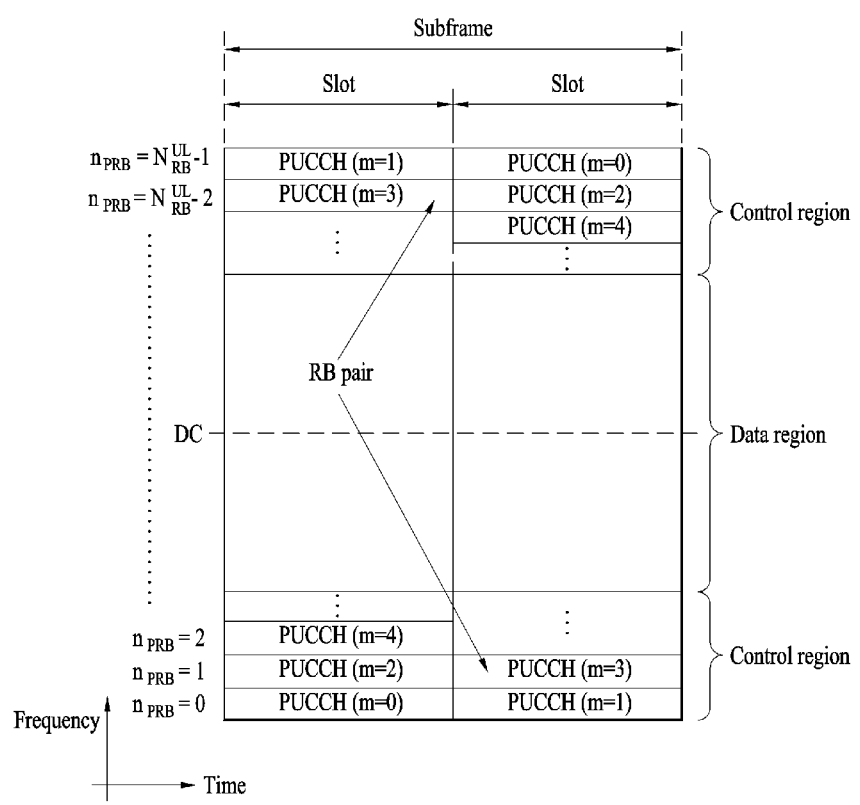
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords.

For example, the HARQ-ACK for a PDCCH or a PDSCH received in one subframe on a single carrier may be represented by 1 bit. If the UE detects the PDCCH and successfully decodes the PDSCH, it will feed back a bit (e.g., 1b) indicating ACK. If the UE fails to detect the PDCCH or fails to decode the PDSCH, it will feed back a bit (e.g., 0b) indicating NACK. The HARQ-ACK for PDCCHs/PDSCHs on multiple carriers or for PDCCH/PDSCHs in multiple subframes may be represented by two bits. For example, when the HARQ-ACK for the PDCCHs/PDSCHs on two carriers or in two subframes is fed back, if the PDCCH is detected either on the two carriers or in two subframes and if the PDSCH is decoded, the corresponding ACK/NACK bit may be set according to the result of decoding of the PDSCH. If the PDCCH is not detected in the other ones of the two carriers or two subframes, the corresponding HARQ-ACK corresponds to DTX, but the UE must feed back the 2-bit HARQ-ACK to the eNB. Accordingly, the UE sets the other one of the two bits of the HARQ-ACK to NACK, and feeds back the same to the eNB.

A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Hereinafter, the PUCCH allocated for SR transmission is referred to as an SR PUCCH, the PUCCH allocated for transmission of HARQ-ACK is referred to as an ACK/NACK PUCCH, and the PUCCH allocated for CSI transmission is referred to as a CSI PUCCH.

Figure 9:
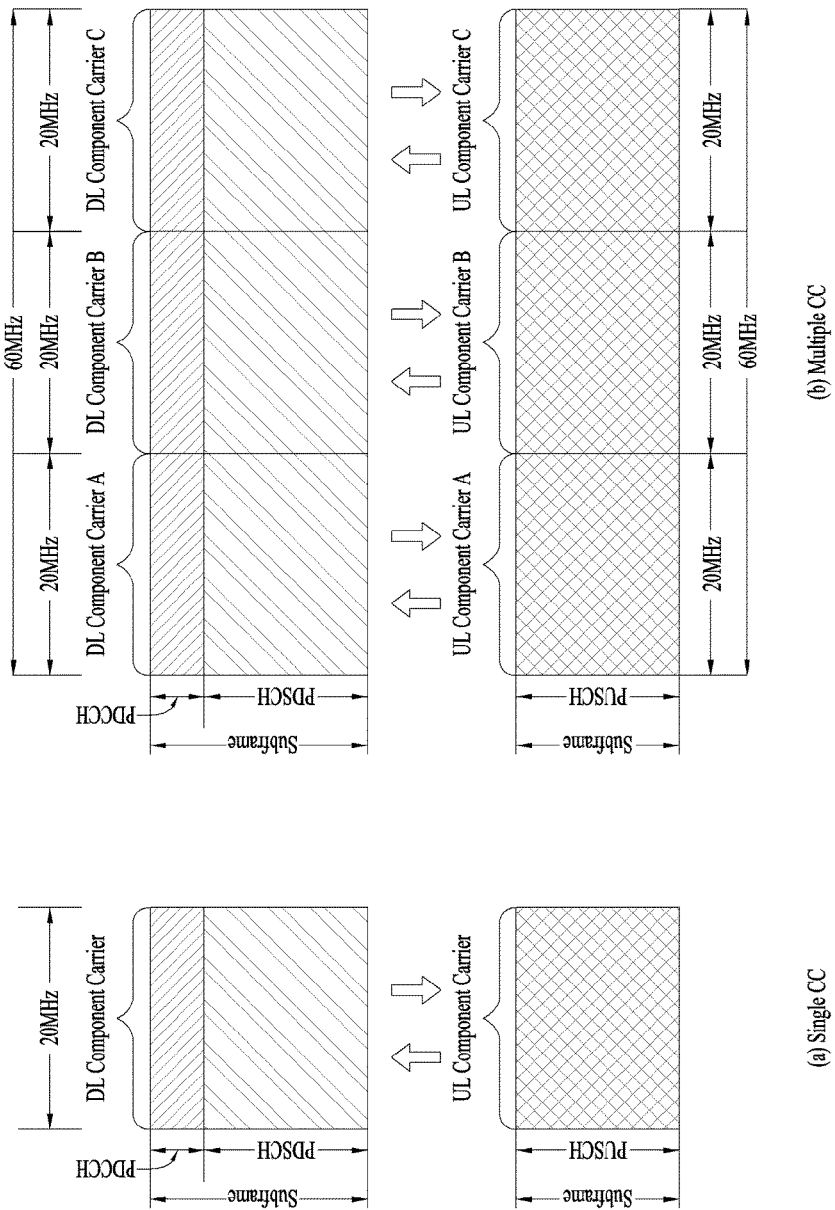
FIG. 9 is a diagram for explaining single-carrier communication and multi-carrier communication.

FIG. 9 is a diagram for explaining single-carrier communication and multi-carrier communication. Specially, FIG. 9(a) illustrates a subframe structure of a single carrier and FIG. 9(b) illustrates a subframe structure of multiple carriers.

Referring to FIG. 9(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 9(b), three 20 MHz CCs in each of UL and DL are aggregated to support a BW of 60 MHz. The CCs may be contiguous or non-contiguous in the frequency domain. Although FIG. 9(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 10:
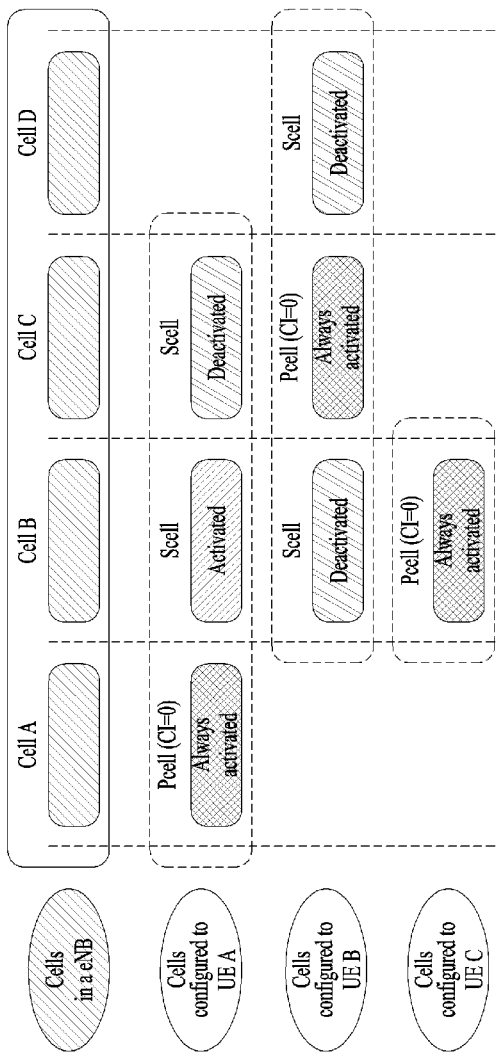
FIG. 10 illustrates the state of cells in a system supporting carrier aggregation (CA).

FIG. 10 illustrates the state of cells in a system supporting CA.

In FIG. 10, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 10, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized as below.

CIF disabled: A PDCCH on a DL CC assigns PDSCH resources on the same DL CC or PUSCH resources on a single linked UL CC No CIF Same as an LTE PDCCH structure (same coding and same CCE-based resource mapping) and as a DCI format CIF enabled: a PDCCH on a DL CC can assign PDSCH/PUSCH resources on a specific DL/UL CC among a plurality of aggregated DL/UL CCs using a CIF.

Extended LTE DCI format with CIF

CIF (if configured) is a fixed x-bit field (e.g. x=3).

CIF (if configured) location is fixed regardless of DCI format size.

Reuse of the LTE PDCCH structure (same coding and same CCE-based resource mapping)

One or more scheduling cells may be configured for one UE and one of the scheduling cells may be a PCC which is in charge of specific DL control signaling and UL PUCCH transmission. A scheduling cell set may be configured UE-specifically, UE-group-specifically, or cell-specifically. The scheduling cell may be configured so as to directly schedule at least itself. That is, the scheduling cell may become a scheduled cell thereof. In the present invention, a cell carrying a PDCCH is referred to as a scheduling cell, a monitoring cell, or an MCC and a cell carrying a PDSCH/PUSCH scheduled by the PDCCH is referred to as a scheduled cell.

The scheduling cell includes a DL CC as a part of all carrier aggregated cells. The UE detects/decodes the PDCCH only on a corresponding DL CC. In this case, a PDSCH/PUSCH of the scheduling cell or a scheduled cell refers to a PDSCH/PUSCH configured to be transmitted on the corresponding cell. A PHICH of the scheduling cell or the scheduled cell refers to a PHICH carrying ACK/NACK for a PUSCH transmitted on the corresponding cell.

After reception/transmission of scheduling, data transmission/reception according to the scheduling, and ACK/NACK reception/transmission for the data transmission, a time delay occurs until data retransmission is performed. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

Transmission timing (or HARQ timing) of ACK/NACK for DL transmission is described below. The UE may receive a PDCCH indicating an SPS release or one or more PDSCHs in M subframes (SFs) (M>1). Each PDSCH signal may include one or more (e.g., two) transport blocks (TB) depending on the transmission mode. If there is a PDSCH signal and/or an SPS release PDCCH signal in M DL subframes, the UE performs transmits ACK/NACK through one UL subframe corresponding to the M DL subframes through operations for ACK/NACK transmission (e.g., ACK/NACK (payload) generation, ACK/NACK resource allocation). The ACK/NACK includes reception response information about the PDSCH signal and/or the SPS release PDCCH signal. The ACK/NACK is basically transmitted through the PUCCH, but if the PUSCH is allocated at the time of ACK/NACK transmission, the ACK/NACK is transmitted through the PUSCH. When a plurality of CCs is configured for the UE, the PUCCH is transmitted only on the Pcell and the PUSCH is transmitted on the scheduled CC. Various PUCCH formats may be used for ACK/NACK transmission. Various methods such as ACK/NACK bundling, ACK/NACK channel selection (CHsel) may be used to reduce the number of ACK/NACK bits.

In the FDD, M=1. In the TDD, M is an integer greater than or equal to 1. In the TDD, the relationship between M DL subframes and a UL subframe in which the ACK/NACK is transmitted is given by a Downlink Association Set Index (DASI).

[Table 3] shows DASI (K:$\{k_0, k_1, \ldots, k_{M-1}\}$) defined in LTE(-A). If there is a PDCCH indicating PDSCH transmission and/or SPS release (Semi-Persistent Scheduling release) in subframe n–k (k∈K), the UE transmits ACK/NACK in subframe n. In FDD, DASI (for simplicity, $d_F$)=4.

TABLE 3

| TDD UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In operating in the TDD scheme, the UE must transmit ACK/NACK signals for one or more DL transmissions (e.g., PDSCH) received through M DL subframes (SF) through one UL SF. ACK/NACK for a plurality of DL SFs is transmitted through one UL SF, using the following methods.

1) ACK/NACK bundling: ACK/NACK bits for a plurality of data units (e.g., PDSCH, semi-persistent scheduling (SPS) release PDCCH, etc.) is combined by a logical operation (e.g., logical AND operation). For example, if all data units are successfully decoded, the receiving terminal (e.g., UE) transmits an ACK signal. On the other hand, if any one of the data units fails to be decoded (or detected), the UE transmits a NACK signal or transmits nothing.

2) Channel selection (CHsel): A UE receiving a plurality of data units (e.g., PDSCH, SPS release PDCCH, etc.) occupies a plurality of PUCCH resources to perform ACK/NACK transmission. The ACK/NACK response for a plurality of data units is identified by a combination of the PUCCH resource actually used for ACK/NACK transmission and the transmitted ACK/NACK content (e.g., the bit value, the QPSK symbol value). The channel selection scheme is also referred to as an ACK/NACK selection scheme and a PUCCH selection scheme.

In the 3GPP LTE/LTE-A system, there are two transmission schemes: open-loop MIMO operated without feedback of channel information and closed-loop MIMO using feedback of the channel information. In closed-loop MIMO, each of a transmitter and a receiver performs beamforming based on the channel information, i.e. CSI, to obtain a multiplexing gain of MIMO antennas. To report the CSI, time and frequency resources which can be used by the UE are controlled by then eNB. For example, the eNB commands the UE to feed back DL CSI by allocating a PUCCH or a PUSCH to the UE in order to obtain the DL CSI.

A CSI report is periodically or aperiodically configured. A periodic CSI report is transmitted by the UE on the PUCCH except for a special case (e.g. when the UE is not configured for simultaneous PUSCH and PUCCH transmission and when a PUCCH transmission timing collides with a subframe with PUSCH allocation). In the CSI, since an RI is dominantly determined by long-term fading, the RI is typically fed back to the UE from the eNB at a cycle longer than that of a PMI and CQI. In contrast, an aperiodic CSI report is transmitted on the PUSCH. The aperiodic CSI report is triggered by a CSI request field included in the DCI (e.g. DCI of DCI format 0 or 4) for scheduling of UL data (hereinafter, UL DCI format). The UE, which has decoded the UL DCI format or a random access response grant for a specific serving cell (hereinafter, serving cell c) in subframe n, performs aperiodic CSI reporting using the PUSCH in subframe n+k in serving cell c when the CSI request field is set to trigger the CSI report and when the CSI request field is not reserved. The PUSCH corresponds to a PUSCH transmitted in subframe n+k according to the UL DCI format decoded in subframe n. In the case of FDD, k=4. In the case of TDD, k is given by the following table.

TABLE 4

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 6 | | | | 4 | 6 |
| 1 | | | | | 6 | | | 4 | | 6 | 4 |
| 2 | | | 4 | | | | | 4 | | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For example, when a UE for which a TDD UL/DL configuration is 6 detects the UL DCI format for serving cell c in subframe 9, the UE performs aperiodic CSI reporting triggered by the CSI request field in the detected UL DCI format on the PUSCH of serving cell c in subframe 9+5, i.e. in subframe 4 of a radio frame following a radio frame including subframe 9 in which the UL DCI format is detected.

The CSI request field is 1 bit or 2 bits in length. If the CSI request field is 1 bit, the CSI request field set to '1' triggers aperiodic CSI report for serving cell c. If the CSI request field is 2 bits, aperiodic CSI report corresponding to, for example, a value of the following table is triggered.

TABLE 5

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In the table above, an indication suggesting the serving cell(s) for which the aperiodic CSI report is triggered by the CSI request field '10' and/or the CSI request field '11' may be configured by a higher layer signal (e.g., RRC signal). The higher layer signal may contain an 8-bit bitmap representing the cell(s) to be triggered by the CSI request field '10' and an 8-bit bitmap representing the cell(s) to be triggered by the CSI request field '11'. In each bitmap, the bits from bit 0, which is the lowest bit, to bit 7, which is the highest bit, correspond to the cells from the cell (i.e., Pcell) having the serving cell index of 0 to the cell having the serving cell index of 7 one by one. In the bitmap for the CSI request field '10', a cell corresponding to the bit set to 1 refers to a cell for which an aperiodic CSI report is triggered by the CSI request field value '10', and a cell corresponding to the bit set to 0 refers to a cell for which an aperiodic CSI report is not triggered by the CSI request field value '10'. In the bitmap for the CSI request field '11', a cell corresponding to a bit set to 1 refers to a cell for which an aperiodic CSI report is triggered by the CSI request field value '11', and a cell corresponding to a bit set to 0 refers to a cell for which an aperiodic CSI report is not triggered by the CSI request field value '11'.

Recently, CoMP technology is being considered for LTE/LTE-A systems. The CoMP technology involves a plurality of nodes. When the CoMP technology is introduced into an LTE/LTE-A system, a new transmission mode associated with the CoMP technology may be defined. There may be various configurations of the CSI-RSs received by the UE depending on how the plurality of nodes participates in communication. Therefore, in the legacy LTE system, the UE is allowed to use at most one CSI-RS configuration or CSI-RS resource configuration in which the UE should assume a non-zero transmission power for the CSI-RS. On the other hand, For a UE having CoMP configured, i.e., a UE set to the CoMP mode, the maximum number of CSI resource configurations that may be used for the UE is greater than one. If the UE is set to a mode in which one or more CSI-RS resource configurations may be configured, namely, if the UE is set to the CoMP mode, the UE may receive a higher layer signal containing information about one or more CSI-RS resource configurations. If not only the CoMP but also the carrier aggregation (CA) is configured for the UE, one or more CSI-RS resource configurations may be used for each serving cell.

In the legacy LTE/LTE-A system, the UE transmits/receives signals to/from one node on a specific serving cell. That is, since there is only one radio link on one serving cell in the legacy LTE/LTE-A system, only one CSI for one serving cell may be calculated by the UE. On the other hand, in the CoMP involving a plurality of nodes, the DL channel state may differ among the nodes or combinations of nodes. Since the CSI-RS resource configuration may vary depending on the nodes or combinations of nodes, the CSI is associated with the CSI-RS resource. In addition, the channel state may vary depending on the interference environment between nodes participating in CoMP. In other words, if CoMP is configured, the state may be measured by UE for each node or combination of nodes, and CSI may be given for each interference environment. Therefore, the maximum number of CSIs that may be calculated for each serving cell of UE may be an integer larger than one. How the UE should report a CSI in order for the UE to obtain CSI may be configured by the higher layer. When CoMP is configured, one or more CSIs may be calculated by the UE. Thus, if the UE is set to the CoMP mode, a CSI report for one or more CSIs per serving cell of the UE may be configured to implement periodic or aperiodic CSI reporting.

As mentioned above, CSI in CoMP is associated with a CSI-RS resource used for channel measurement and a resource used for interference measurement (hereinafter, interference measurement (IM) resource). Hereinafter, an association of one CSI-RS resource for signal measurement and one IM resource for interference measurement is referred to as a CSI process. That is, the CSI process may be associated with one CSI-RS resource and one IM resource (IMR).

Preferably, an eNB (hereinafter, a serving eNB) to which the UE is connected or which manages a node of a cell where the UE is positioned does not transmit any signal on an IM resource. Thus, the IM resource may be configured for the UE in a manner similar to the zero-power CSI-RS. For example, the eNB may inform the UE of the resource elements used for interference measurement using a 16-bit bitmap indicating the zero power CSI-RS pattern described above and CSI-RS subframe configurations. When the IM resource is explicitly configured for the UE, the UE measures the interference on the IM resource and calculates the CSI assuming that the interference is interference on the CSI reference resource on which the CSI measurement is based. More specifically, the UE may perform channel measurements based on the CSI-RS or CRS and perform interference measurement based on the IM resources to obtain CSI based on the channel measurement and the interference measurement.

Therefore, one CSI reported by the UE may correspond to one CSI process. Each CSI process may have an independent CSI feedback configuration. The independent feedback configuration refers to a feedback mode, a feedback period, a feedback offset, and the like. The feedback offset corresponds to the start subframe with feedback among the subframes in a radio frame. The feedback mode may be defined differently depending on whether the CQI included in the CSI that is fed back among RI, CQI, PMI and TPMI is a CQI for a wideband, a CQI for a subband, or a CQI for a subband selected by the UE, and whether the CSI includes the PMI and whether the CSI includes a single PMI or a plurality of PMIS.

If the CSI Request field is configured with 2 bits and the UE is set to a mode (in Transmission Mode 10) in which one or more CSI processes may be configured for at least one cell, an aperiodic CSI report corresponding to the values in the following table is triggered. The following table shows the CSI request field for the PDCCH/EPDCCH with an uplink DCI format in the UE specific search space.

TABLE 6

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

In the above table, an indication for CSI cell(s) for which the aperiodic CSI report is triggered by the CSI request field '01', the CSI request field '10' and/or the CSI request field '11' may be configured by a higher layer signal (e.g., an RRC signal). When a CSI process is configured for the serving cell by a higher layer, whether or not an aperiodic CSI report is triggered by the CSI request field '01', the CSI request field '10' and the CSI request field '11' is configured. Trigger 01 for the CSI process indicates whether the corresponding CSI process is triggered by the CSI request field set to '01', trigger 10 indicates whether the corresponding CSI process is triggered by the CSI request field set to '10', and trigger 11 indicates whether the corresponding CSI process is triggered by the CSI request field set to '11'. According to Trigger 01, Trigger 10 and Trigger 11 for the CSI process, the corresponding CSI process may be triggered by all, none or some of the CSI request field '01', the CSI request field '10' and the CSI request field '11'.

The higher layer signal may contain an 8-bit bitmap indicating the cell(s) to be triggered by the CSI request field '10' and an 8-bit bitmap indicating the cell(s) to be triggered by the CSI request field '11'. In each bitmap, the bits from bit 0, which is the lowest bit, to bit 7, which is the highest bit, correspond to the cells from the cell (i.e., Pcell) having the serving cell index of 0 to the cell having the serving cell index of 7 one by one. In the bitmap for the CSI request field '10', a cell corresponding to the bit set to 1 refers to a cell for which an aperiodic CSI report is triggered by the CSI request field value '10', and a cell corresponding to the bit set to 0 refers to a cell for which an aperiodic CSI report is not triggered by the CSI request field value '10'. In the bitmap for the CSI request field '11', a cell corresponding to a bit set to 1 refers to a cell for which an aperiodic CSI report is triggered by the CSI request field value '11', and a cell corresponding to a bit set to 0 refers to a cell for which an aperiodic CSI report is not triggered by the CSI request field value '11'.

Figure 11:
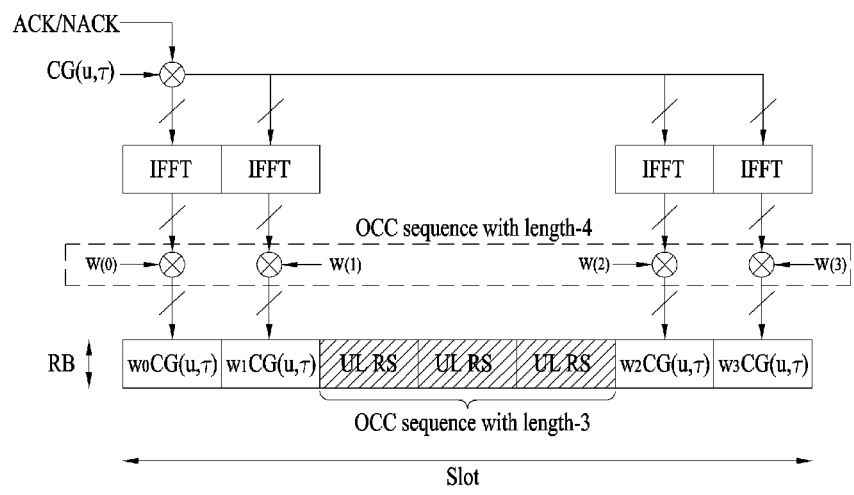
FIGS. 11 to 13 illustrate an example of physically mapping a PUCCH format to a PUCCH resource.
Figure 12:
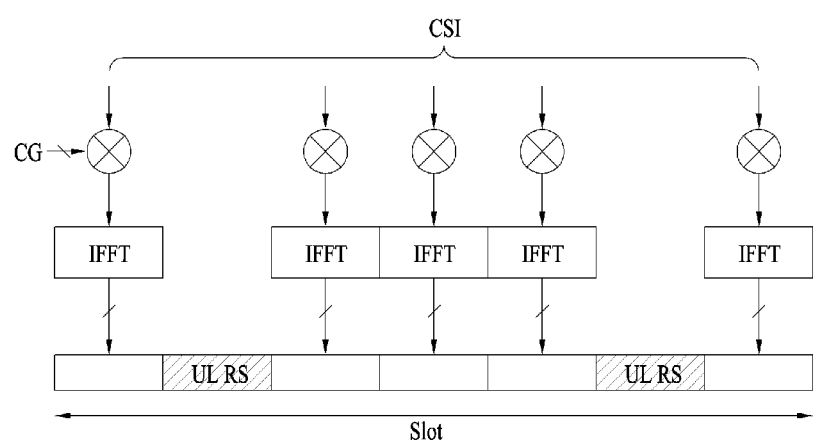
Figure 13:
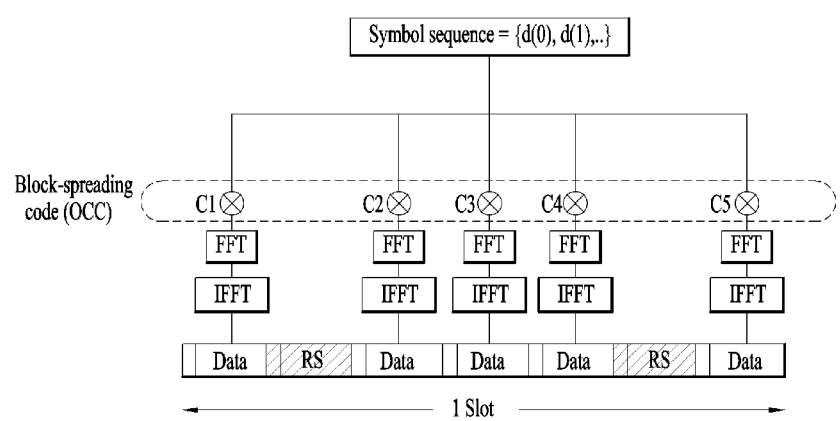

FIGS. 11 to 13 illustrate an example of physically mapping a PUCCH format to a PUCCH resource.

FIG. 11 exemplarily shows slot level structures of a PUCCH format.

Particularly, FIG. 11 shows the PUCCH format 1a and 1b structure in case of a normal CP.

In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

FIG. 12 illustrates an example of transmitting channel state information using PUCCH format 2/2a/2b in a UL slot having a normal CP.

Referring to FIG. 12, in the case of a normal CP, one UL subframe consists of 10 OFDM symbols except a symbol carrying a UL reference signal (RS). The channel state information is coded into 10 transmission symbols (also referred to as complex modulation symbols) through block coding. The 10 transmission symbols are respectively mapped to the 10 OFDM symbols and transmitted to the eNB.

FIG. 13 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 13 as an example, one symbol sequence is spread by a length-5 (i.e. SF=5) OCC and then mapped to 5 SC-FDMA symbols. Although a total of 2 RS symbols is used during one slot in FIG. 13, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 13, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

As illustrated in FIGS. 11 to 13, the UCI carried by one PUCCH differs in size and usage according to the PUCCH format, and the size thereof may vary according to the coding rate. The following table illustrates the mapping relationship between the PUCCH formats and the UCI.

For example, the following PUCCH formats may be defined.

TABLE 7

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to the table, the PUCCH format 1 series is mainly used to transmit ACK/NACK information, and the PUCCH format 2 series is mainly used to carry channel state information (CSI) such as CQI/PMI/RI, and the PUCCH format 3 series is mainly used to transmit ACK/NACK information.

The UE is allocated a PUCCH resource for transmission of UCI from an eNB by a higher layer signal, a dynamic control signal, or in an implicit manner. The physical resources used for PUCCH depends on two parameters, $N^{(2)}_{RB}$ and $N^{(1)}_{cs}$, given by higher layers. Variable $N^{(2)}_{RB} \geq 0$ denotes the bandwidth available for PUCCH format 2/2a/2b transmission in each slot, expressed as an integer multiple of $N^{RB}_{sc}$. The variable $N^{(1)}_{cs}$ denotes the number of cyclic shift used for PUCCH formats 1/1a/1b in a resource block used for a mix of formats 1/1a/1b and 2/2a/2b. The value of $N^{(1)}_{cs}$ is an integer multiple of $\Delta^{PUCCH}_{shift}$ within the range of $\{0, 1, \ldots, 7\}$, $\Delta^{PUCCH}_{shift}$ is provided by higher layers. No mixed resource block is present if $N^{(1)}_{cs}=0$. At most one resource block in each slot supports a mix of formats 1/1a/1b and 2/2a/2b. Resources used for transmission of PUCCH formats 1/1a/1b, 2/2a/2b and 3 are represented by the non-negative indices $n^{(1,p)}_{PUCCH}$, $n^{(2,p)}_{PUCCH} < N^{(2)}_{RB} N^{RB}_{sc} + \text{ceil}(N^{(1)}_{cs}/8) \cdot (N^{RB}_{sc} - N^{(1)}_{cs} - 2)$, and $n^{(3,p)}_{PUCCH}$, respectively.

Specifically, an orthogonal sequence and/or a cyclic shift to be applied to corresponding UCI is determined from a PUCCH resource index according to a specific rule predefined for each PUCCH format, and resource indexes of two resource blocks in a subframe to which a PUCCH is mapped are given. For example, the PRBs to be used for transmission of PUCCH in $n_s$ are given by the following equation.

$$n_{PRB} = \begin{cases} \left\lfloor \dfrac{m}{2} \right\rfloor & \text{if } (m + n_s \bmod 2) \bmod 2 = 0 \\ N^{UL}_{RB} - 1 - \left\lfloor \dfrac{m}{2} \right\rfloor & \text{if } (m + n_s \bmod 2) \bmod 2 = 1 \end{cases} \quad \text{Equation 1}$$

where the variable m depends on the PUCCH format. PUCCH format 1/1a/1b, PUCCH format 2/2a/2b, and PUCCH format 3 are given by Equation 2, Equation 3 and Equation 4, respectively.

$$m = \begin{cases} N_{RB}^{(2)} & \text{if } n_{PUCCH}^{(1,\tilde{p})} < c \cdot \\ & N_{cs}^{(1)} / \Delta_{shift}^{PUCCH} \\ \left\lfloor \dfrac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + & \text{otherwise} \\ N_{RB}^{(2)} + \left\lceil \dfrac{N_{cs}^{(1)}}{8} \right\rceil \end{cases}$$ Equation 2

$$c = \begin{cases} 3 & \text{normal cyclic prefix} \\ 2 & \text{extended cyclic prefix} \end{cases}$$

In Equation 2, $n^{(1,\tilde{p})}_{PUCCH}$ is a PUCCH resource index of an antenna port p for PUCCH format 1/1a/1b. For ACK/NACK PUCCH, it is implicitly determined by the first CCE index of the PDCCH carrying scheduling information on the corresponding PDSCH.

$$m = \lfloor n_{PUCCH}^{(2,\tilde{p})} / N_{sc}^{RB} \rfloor$$ Equation 3

$n^{(2)}_{PUCCH}$ is a PUCCH resource index of an antenna port p for PUCCH format 2/2a/2b, and the value thereof is transmitted from the eNB to the UE by higher layer signaling.

$$m = \lfloor n_{PUCCH}^{(3,\tilde{p})} / N_{SF,0}^{PUCCH} \rfloor$$ Equation 4

$n^{(3)}_{PUCCH}$ is a PUCCH resource index of an antenna port p for PUCCH format 2/2a/2b, and the value thereof is transmitted from the eNB to the UE by higher layer signaling. $N^{PUCCH}_{SF,0}$ denotes the spreading factor (SF) for the first slot of a subframe. $N^{PUCCH}_{SF,0}$ is 5 for both 2 slots in a subframe using general PUCCH format 3. $N^{PUCCH}_{SF,0}$ is 5 and 4 for the first and second slots in a subframe using reduced PUCCH format 3.

Referring to Equation 2, a PUCCH resource for ACK/NACK is not pre-allocated to each UE, and but a plurality of PUCCH resources is allocated to a plurality of UEs in a cell at every point of time. Specifically, a PUCCH resource used by the UE to transmit the ACK/NACK is dynamically determined based on the PDCCH carrying the scheduling information on the PDSCH carrying the corresponding downlink data or the PDCCH indicating SPS release. A region in which the PDCCH is transmitted in each DL subframe includes a plurality of control channel elements (CCEs), and the PDCCH transmitted to the UE consists of one or more CCEs. The UE transmits ACK/NACK through a PUCCH resource linked to a specific CCE (for example, the lowest index CCE) among the CCEs constituting the PDCCH that the UE has received.

Each PUCCH resource index corresponds to a PUCCH resource for ACK/NACK. For example, when it is assumed that the scheduling information on the PDSCH is transmitted to the UE through a PDCCH consisting of the CCEs #4 to #6 and the CCE #4 is linked to the PUCCH resource index 4, the UE transmits an ACK/NACK for the PDSCH to the eNB through PUCCH resource #4 corresponding to CCE #4. Specifically, the PUCCH resource index for transmission by two antenna ports ($p_0$ and $p_1$) in the 3GPP LTE(-A) system is determined as follows.

$$n_{PUCCH}^{(1,\tilde{p}=\tilde{p}0)} = n_{CCE} + N_{PUCCH}^{(1)}$$ Equation 5

$$n_{PUCCH}^{(1,\tilde{p}=\tilde{p}1)} = n_{CCE} + 1 + N_{PUCCH}^{(1)}$$ Equation 5

Here, $n^{(1,\tilde{p}=\tilde{p}0)}_{PUCCH}$ denotes a PUCCH resource index (i.e. number) to be used by antenna port $p_0$, $n^{(1,\tilde{p}=\tilde{p}1)}_{PUCCH}$ denotes a PUCCH resource index to be used by antenna port $p_1$, and $N^{(1)}_{PUCCH}$ denotes a signaling value received from higher layer. $n_{CCE}$ is the lowest of CCE indexes used for PDCCH transmission. For example, when the CCE aggregation level is higher than or equal to 2, the first CCE index among indexes of a plurality of aggregated CCEs for PDCCH transmission is used in determining an ACK/NACK PUCCH resource. The cyclic shift (CS), orthogonal code (OC) and PRB for the PUCCH format are obtained from $n^{(1)}_{PUCCH}$.

When PUCCH format 3 is configured for ACK/NACK transmission, a specific one of the PUCCH format 3 resource indexes ($n^{(3)}_{PUCCH}$) allocated by an higher layer (e.g., RRC) may be indicated by an ACK/NACK resource indicator (ARI) value of the DL grant PDCCH (explicit PUCCH resource). The ARI is transmitted through the TPC field of the PDCCH that schedules PDSCH of the Scell. The OC and PRB for PUCCH format 3 are obtained from $n^{(3)}_{PUCCH}$.

In the case of EPDCCH-based scheduling, the ACK/NACK transmission resource for the DL data scheduled by the DL grant EPDCCH may be determined as a PUCCH resource linked to a specific ECCE index (e.g., minimum ECCE index) constituting the DL grant EPDCCH and an ECCE index obtained by adding a specific offset value to the specific ECCE index. In addition, the ACK/NACK feedback transmission resource may be determined as a PUCCH resource linked to a specific ECCE index (e.g., a minimum ECCE index) constituting the DL grant EPDCCH or a PUCCH resource obtained by adding a specific offset value to the specific ECCE index. Here, the specific offset value may be determined by a value directly signaled through the ARO (ACK/NACK Resource Offset) field in the DL grant EPDCCH and/or a value designated dedicatedly for each antenna port. Specifically, the information signaled through the TPC field and the ARO field in the DL grant EPDCCH according to the frame structure type (e.g., FDD or TDD) and the ACK/NACK feedback transmission scheme (e.g., PUCCH format 3 or channel selection) may be configured as follows. For simplicity, the TPC command for PUCCH power control is defined as "TPC value", an offset value added in determining an implicit PUCCH index is defined as "ARO value", and the ARI indicating a specific one of a plurality of PUCCH format 3 indexes or a plurality of PUCCH format 1 indexes (a plurality of PUCCH format 1 index groups) allocated through RRC is defined "ARI value". A fixed value (e.g., '0') that is inserted without any information (for use such as virtual CRC) is defined as a "fixed value".

The remaining PUCCH resource(s) for SR, ACK/NACK and/or CSI other than the (ACK/NACK) PUCCH resource(s) determined dynamically (i.e., implicitly) on the Pcell in the UL subframe corresponding to the ACK/NACK transmission timing for the DL subframe by detecting the PDCCH/EPDCCH on the Pcell in the DL subframe are configured by a higher layer.

Not only aggregation of a plurality of CCs having the same UL-DL subframe configuration but also aggregation of a plurality of CCs having different UL-DL subframe configurations is possible. For example, aggregation of multiple CCs with different UL-DL subframe configurations includes aggregation of multiple CCs configured with different UL-DL configurations (for simplicity, referred to as different TDD CAs) and aggregation of TDD CCs and FDD CCs.

Cross-CC scheduling may be supported even when multiple CCs with different subframe configurations are aggregated. In this case, the HARQ timing configured for the scheduling CC and the HARQ timing configured for the scheduled CC may be different from each other. Therefore, in order to perform, through the scheduling CC, UL grant and/or PHICH transmission for the UL data transmitted on the scheduling CC UL SF and the cross-CC scheduled CC UL SF, the same HARQ timing or different HARQ timings (configured in a specific UL-DL configuration) may be applied to the respective CCs, or the HARQ timing configured in a specific UL-DL configuration may be commonly applied to all CCs (i.e., PCCs (or scheduling CCs)/SCCs) is. A specific UL-DL configuration (hereinafter, a reference configuration (Ref-Cfg)) may be the same as a UL-DL configuration (MCC-Cfg) configured for a PCC (or a scheduling CC) or a UL-DL configuration (SCC-Cfg) configured for an SCC, or may be determined as another UL-DL configuration. Herein, the UL grant or PHICH timing may refer to a DL subframe configured so as to transmit/receive a PHICH for a UL grant for scheduling UL data of a specific UL subframe or the corresponding UL data transmission, or a timing relationship therebetween. Specifically, apply a UL grant or PHICH timing configured for a specific CC (i.e., Ref-CC) or a specific Ref-cfg may mean using the UL-configuration (UD-Cfg) of a specific CC or a parameter value corresponding to a specific UD-cfg.

When the PDCCH/PDSCH-to-ACK/NACK timing (for example, 4 ms) of the legacy FDD cell is directly applied to the PDSCH of the FDD cell in the TDD PCell-FDD SCell CA, ACK/NACK may not be transmitted if the TDD PCell is defined as DL SF at the ACK/NACK transmission timing. Therefore, a new DL HARQ timing other than the PDCCH/PDSCH-to-ACK/NACK timing defined in the legacy FDD cell may be applied. Likewise, a new HARQ timing may be applied as the UL HARQ timing. For example, there may be the following DL HARQ timings:

1) DL HARQ timing for the TDD Scell in case of the FDD Pcell (PDSCH to HARQ-ACK timing):
 A. Self-scheduling: the DL HARQ timing of the FDD Pcell is applied.
 B. Cross-carrier scheduling: the DL HARQ timing of the FDD Pcell is applied.

2) DL HARQ timing for the FDD Scell in case of the TDD Pcell (PDSCH to HARQ-ACK timing):
 A. Self-Scheduling
  i. Option 1: For each TDD Pcell U/D configuration, new additional timings for DL subframes for which DL HARQ timing is not defined at the TDD Pcell timing+TDD Pcell timing (or new timings for each TDD Pcell U/D configuration for addressing more DL subframes than defined in the TDD Pcell) are applied.
  ii. Option 2: A reference U/D configuration defined (or configured) for the FDD Scell is applied. The (configurable) reference U/D configuration depends on the UD configuration of the TDD Pcell (The new timing may be added to the reference U/D configuration for supporting more DL subframes).
 B. Cross-carrier scheduling: The same options as those (Option 1 and Option 2) of the self-scheduling case or only TDD Pcell timing is applied.

In the next system after LTE, a method of operating by re-configuring/changing the UL/DL SF direction for the purpose of enhanced interference mitigation and traffic adaptation (eIMTA) in TDD situations is considered. To this end, the basic UL-DL configuration (UD-cfg) of the TDD cell (or CC) may be (semi-)statically configured using higher layer signaling (e.g., SIB), and then the operation UD-cfg of the cell (or CC) may be dynamically reconfigured/changed using lower layer signaling (e.g., L1 (Layer 1) signaling (e.g., PDCCH)). For simplicity, the basic UD-cfg is referred to as SIB-cfg, and the operation UD-cfg is referred to as actual-cfg. The subframe configuration according to the UD-cfg is established based on [Table 1]. When a DL SF, a UL SF, and a special SF are defined as D, U, and S, respectively, reconfiguration of D to U (or S) It may not be easy or may cause deterioration, considering the legacy DL reception/measurement using CRS in the D. On the other hand, in the case of reconfiguration of a U (or S) to D, the base station may provide additional DL resources to the eIMTA UE by not intentionally scheduling/configuring a UL signal that may be transmitted from the legacy UE through the U.

In view of the above, the actual-cfg may be selectively determined only among UD-cfg (including SIB-cfg) including all Ds in the SIB-cfg. That is, a UD-cfg in which D is placed at the D positions in SIB-cfg may be determined as an actual-cfg, but a UD-cfg in which U is placed at a D position in SIB-cfg may not be determined as an actual-cfg. Meanwhile, in eIMTA, a reference UD-cfg (hereinafter, D-ref-cfg) may be separately configured by a higher layer (signaling) in order to configure an HARQ timing (for example, HARQ-ACK feedback transmission timing) for DL scheduling. Considering this, the actual-cfg may be selectively determined only among the UD-cfgs (including the D-ref-cfg) which include all Us in D-ref-cfg. Therefore, the UD-cfg in which D is placed at the U position in the D-ref-cfg may not be determined as an actual-cfg.

Therefore, the D-ref-cfg may be configured by a UD-cfg which includes all Ds on possible actual-cfg candidates, and the SIB-cfg may be configured as a UD-cfg which includes all Us on possible actual-cfg candidates. That is, D-ref-cfg may be configured as a D superset UD-cfg for possible actual-cfg candidates, and the SIB-cfg may be configured for a U superset UD-cfg for possible actual-cfg candidates. The reference UD-cfg (hereinafter, U-ref-cfg) of the HARQ timing (e.g., UG/PUSCH/PHICH transmission timing) for UL scheduling may be configured as an SIB-cfg. Thus, the U in D-ref-cfg is considered as a fixed U, and the D in the SIB-cfg may be considered as a fixed D. Accordingly, only SFs that are D in the D-ref-cfg and U in the SIB-cfg may be considered as flexible U that may be reconfigured/changed from U to D. The flexible U may be reconfigured/changed from U to D by the actual-cfg.

That is, one of the UD-cfg(s) including all D's in the SIB-cfg and all U's in the D-ref-cfg after the SIB-cfg/D-ref-cfg is configured by a higher layer (signaling) may be configured for an actual-cfg by L1 signaling.

Similarly, in the FDD system, the eIMTA may be applied (hereinafter, FDD eIMTA) by reconfiguring some UL SFs on a UL carrier as DL SFs (and/or special SFs). For example, operation may be performed by reconfiguring/changing a UL SF on an UL carrier according to the TDD UL-DL configuration.

In a subframe, a plurality of UCIs, a plurality of PUCCHs, or a plurality of PUSCHs may collide. Priorities are given to the uplink signal transmissions due to a constraint on the UCI payload that may be transmitted on a single uplink channel, disallowance of simultaneous transmission of a plurality of PUCCHs through a Pcell by a UE, and the like. Only the high priority signal(s) is transmitted in the corresponding subframe and the lower priority signal(s) is dropped in the corresponding subframe.

The following table illustrates a payload (bits per bandwidth part (BP) (bits/BP)) according to CSI information, mode state, and PUCCH reporting mode according to PUCCH report type.

TABLE 8

| PUCCH Reporting Type | Reported | Mode State | Mode 1-1 | Mode 2-1 | Mode 1-0 | Mode 2-0 |
|---|---|---|---|---|---|---|
| 1 | Sub-band CQI | RI = 1 | NA | 4 + L | NA | 4 + L |
|  |  | RI > 1 | NA | 7 + L | NA | 4 + L |
| 1a | Sub-band CQI/ second PMI | 8 antenna ports RI = 1 | NA | 8 + L | NA | NA |
|  |  | 8 antenna ports 1 < RI < 5 | NA | 9 + L | NA | NA |
|  |  | 8 antenna ports RI > 4 | NA | 7 + L | NA | NA |
|  |  | 4 antenna ports RI = 1 | NA | 8 + L | NA | NA |
|  |  | 4 antenna ports 1 < RI ≤ 4 | NA | 9 + L | NA | NA |
| 2 | Wideband CQI/PMI | 2 antenna ports RI = 1 | 6 | 6 | NA | NA |
|  |  | 4 antenna ports RI = 1 | 8 | 8 | NA | NA |
|  |  | 2 antenna ports RI > 1 | 8 | 8 | NA | NA |
|  |  | 4 antenna ports RI > 1 | 11 | 11 | NA | NA |
| 2a | Wideband first PMI | 8 antenna ports RI < 3 | NA | 4 | NA | NA |
|  |  | 8 antenna ports 2 < RI < 8 | NA | 2 | NA | NA |
|  |  | 8 antenna ports RI = 8 | NA | 0 | NA | NA |
|  |  | 4 antenna ports 1 ≤ RI ≤ 2 | NA | 4 | NA | NA |
|  |  | 4 antenna ports 2 ≤ RI ≤ 4 | NA | NA | NA | NA |
| 2b | Wideband CQI/ second PMI | 8 antenna ports RI = 1 | 8 | 8 | NA | NA |
|  |  | 8 antenna ports 1 < RI < 4 | 11 | 11 | NA | NA |
|  |  | 8 antenna ports RI = 4 | 10 | 10 | NA | NA |
|  |  | 8 antenna ports RI > 4 | 7 | 7 | NA | NA |
|  |  | 4 antenna ports RI = 1 | 8 | 8 | NA | NA |
|  |  | 4 antenna port 1 < RI ≤ 4 | 11 | 11 | NA | NA |
| 2c | Wideband CQI/ first PMI/ second PMI | 8 antenna ports RI = 1 | 8 | NA | NA | NA |
|  |  | 8 antenna ports 1 < RI ≤ 4 | 11 | NA | NA | NA |
|  |  | 8 antenna ports 4 < RI ≤ 7 | 9 | NA | NA | NA |
|  |  | 8 antenna ports RI = 8 | 7 | NA | NA | NA |
|  |  | 4 antenna ports RI = 1 | 8 | NA | NA | NA |
|  |  | 4 antenna port 1 < RI ≤ 4 | 11 | NA | NA | NA |
| 3 | RI | 2/4 antenna ports, 2-layer spatial multiplexing | 1 | 1 | 1 | 1 |
|  |  | 8 antenna ports, 2-layer spatial multiplexing | 1 | NA | NA | NA |
|  |  | 4 antenna ports, 4-layer spatial multiplexing | 2 | 2 | 2 | 2 |
|  |  | 8 antenna ports, 4-layer spatial multiplexing | 2 | NA | NA | NA |
|  |  | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|  |  | 8 antenna ports, 4 and 8-layer spatial multiplexing | 5 |  |  |  |
|  |  | 4 antenna ports, 2-layer spatial multiplexing | 4 |  |  |  |
|  |  | 4 antenna ports, 4-layer spatial multiplexing | 5 |  |  |  |
| 6 | RI/PTI | 8 antenna ports, 2-layer spatial multiplexing | NA | 2 | NA | NA |
|  |  | 8 antenna ports, 4-layer spatial multiplexing | NA | 3 | NA | NA |
|  |  | 8 antenna ports, 8-layer spatial multiplexing | NA | 4 | NA | NA |
|  |  | 4 antenna ports, 2-layer spatial multiplexing | NA | 2 | NA | NA |
|  |  | 4 antenna ports, 4-layer spatial multiplexing | NA | 3 | NA | NA |

Referring to the table above, when the CSI report of the PUCCH reporting type 3, 5 or 6 of a serving cell conflicts with the PUCCH reporting type 1, 1a, 2, 2a, 2b, 2c or 4 of the same serving cell, namely, when the corresponding reporting timing is the same subframe, the CSI report of the latter PUCCH reporting type has a low priority and is dropped at the corresponding reporting timing. For a UE set to transmission mode 10, if there is a conflict between CSI reports of the same serving cell with the same priority PUCCH reporting type and the CSI reports correspond to different CSI processes, all CSI reports corresponding to CSI processes are dropped except a CSI process with the lowest CSI process ID. When there is a conflict between CSI reports of the same serving cell having PUCCH reporting types of the same priority for a UE set to transmission mode 1-9 and configured with CSI subframe set $C_{SCI,0}$ and CSI subframe set $C_{SCI,1}$ by a higher layer signal for the serving cell the CSI report corresponding to the CSI subframe set $C_{SCI,1}$ is dropped. For a UE set to transmission mode 10 and configured with CSI subframe set $C_{SCI,0}$ and CSI subframe set $C_{CSI,1}$ by a higher layer signal for the serving cell, when there is a conflict between CSI reports of the same serving cell having PUCCH reporting types of the same priority and the CSI reports correspond to CSI processes having the same CSI-process ID, the CSI report corresponding to the CSI subframe set $C_{SCI,1}$ is dropped. If the UE is configured with more than one serving cell, the UE transmits a CSI report on only one serving cell in a given subframe. For the given subframe, when a CSI report of PUCCH reporting type 3, 5, 6 or 2a of a serving cell conflicts with a CSI report of PUCCH reporting type 1, 1a, 2, 2b, 2c or 4 of another serving cell, the latter CSI has a low priority and is dropped at the subframe (i.e., the corresponding transmission timing). For a given subframe, if the CSI report of a PUCCH reporting type 2, 2b, 2c or 4 of a serving cell conflicts with a CSI report of a PUCCH reporting type 1 or 1a of another serving cell, the latter CSI report may have the lower priority and is dropped in the subframe (i.e., at the corresponding transmission timing). For serving cells in which the UE is set to transmission mode 1-9 in the given subframe, if there is a conflict between CSI reports of different serving cells with PUCCH reporting types having the same priority, all the CSI reports on the serving cells are dropped except the CSI report on a serving cell having the lowest serving cell index. For the serving cells in which the UE is set to transmission mode 10 in the given subframe, if there is a conflict between CSI reports of different serving cells with PUCCH reporting types having the same priority and the CSI reports correspond to CSI processes having the same CSI-process ID, all the CSI reports on the serving cells are dropped except the CSI report on a serving cell having the lowest serving cell index. For the serving cells in which the UE is set to transmission mode 10 in the given subframe, when there is a conflict between CSI reports of different serving cells with PUCCH reporting types having the same priority and the CSI reports correspond to CSI processes having different CSI-process IDs, all the CSI reports on the serving cells are dropped except the CSI report on a serving cell having CSI reports corresponding to a CSI process having the lowest CSI-process ID. In the given subframe, if the CSI report of a serving cell in which the UE is set to transmission mode 1-9 conflicts with the CSI report(s) corresponding to the CSI process(es) of other serving(s) in which the UE is set to transmission mode 10, and the CSI reports of the serving cells are of PUCCH reporting types of the same priority, the CSI report(s) corresponding to the CSI process(es) with the CSI process ID of the other serving cell(s)>1 are dropped. In the given subframe, if the CSI report of a serving cell in which the UE is set to transmission mode 1-9 conflicts with a CSI report corresponding to the CSI process ID=1 of another serving cell in which the UE is set to transmission mode 10, and the CSI reports of the serving cells are of PUCCH reporting types of the same priority, the CSI report of the serving cell with the highest serving cell index is dropped.

If the UE is not configured for simultaneous PUSCH and PUCCH transmission, or if the UE is configured for simultaneous PUSCH and PUCCH transmission but it is not the timing for PUSCH transmission, CSI is dropped when the CSI conflicts with a positive SR in the same subframe.

In the case where a periodic CSI report and HARQ-ACK conflicts with each other for a UE in the same subframe without a PUSCH, the periodic CSI report is dropped if the periodic CSI report and the HARQ-ACK cannot be transmitted on a single uplink channel (e.g., if the concurrent ACK/NACK and CQI parameter provided by the UE is set to False). In the case where a periodic CSI report and HARQ-ACK conflicts with each other for a UE configured with a single serving cell and not configured in PUCCH Format 3 in the same subframe without a PUSCH, the concurrent ACK/NACK and CQI parameter provided by the higher layer is set to True, the periodic CSI report is multiplexed with the HARQ-ACK on the PUCCH. Otherwise, the CSI is dropped.

If the UE is not configured for simultaneous PUSCH and PUCCH transmission, the UE transmits a periodic CSI report on the PUCCH in a subframe without PUSCH allocation and transmits the periodic CSI report on the PUSCH of a serving cell having the lowest serving cell index in a subframe with PUSCH allocation. When a periodic CSI report and an aperiodic CSI report are generated in the same subframe, the UE transmits only the aperiodic CSI report in the subframe.

When an SR conflicts with ACK/NACK, the SR and ACK/NACK may be multiplexed and transmitted together.

Hereinafter, a description will be given of transmission timing adjustment.

In the LTE system, the amount of time that a signal transmitted from a UE takes to reach an eNB may vary depending on a radius of a cell, a location of the UE in the cell, mobility of the UE, and the like. That is, unless the eNB controls UL transmission timing for each UE, interference may occur between UEs while each UE communicates with the eNB. Moreover, this may increase an error occurrence rate at the eNB. The amount of time that the signal transmitted from the UE takes to reach the eNB may be referred to as a timing advance. Assuming that a UE is randomly located within the cell, the timing advance of the UE may vary depending on a location of the UE. For example, if the UE is located at the boundary of the cell rather than the center of the cell, the timing advance of the UE may be increased. In addition, the timing advance may vary depending on a frequency band of the cell. Thus, the eNB needs to be able to manage or adjust transmission timing of UEs in the cell to prevent the interference between UEs. The management or adjustment of transmission timing, which is performed by the eNB, may be referred to as timing advance maintenance or time alignment.

The timing advance maintenance or time alignment may be performed during the random access procedure as described above. During the random access procedure, an eNB may receive a random access preamble from a UE and then calculate a timing advance value using the received random access preamble. The UE may receive the calculated timing advance value through a random access response and then update signal transmission timing based on the received timing advance value. Alternatively, after receiving an uplink reference signal (e.g., sounding reference signal (SRS)) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

Figure 14:
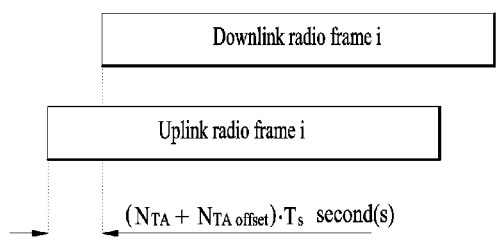
FIG. 14 illustrates timing of a UL frame.

FIG. 14 illustrates timing of a UL frame. Referring to FIG. 14, a UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in the case of a FDD frame structure, and $N_{TAoffset}=624$ in the case of a TDD frame structure. $N_{TA}$ may be indicated by the TAC, and $T_s$ represents a sampling time. The UL transmission timing may be adjusted in unit of a multiple of $16T_s$. The TAC may be given as 11 bits in the random access response, and it may indicate a value of 0 to 1282. In addition, $N_{TA}$ may be given TA*16. Alternatively, the TAC may be given as 6 bits, and it may indicate a value of 0 to 63. In this case, $N_{TA}$ is given as $N_{TA,old}+(TA-31)*16$. The TAC received in subframe n may be applied starting from subframe n+6.

Meanwhile, in case a UE use a plurality of serving cells, there may be serving cells having similar timing advance characteristics. For example, serving cells having similar frequency characteristics (e.g. frequency bands) or similar propagation delays may have similar timing advance characteristics. Thus, when carrier aggregation is performed, serving cells having similar timing advance characteristics may be managed as a group to optimize signaling overhead caused by adjustment of multiple uplink timing synchronization. Such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling). Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or secTAG). A secondary TAG identifier (sTAG ID) may be used to indicate the corresponding sTAG of an SCell. If the sTAG ID is not configured for the SCell, the SCell may be configured as a part of pTAG. One TA may be commonly applied to all CCs included in one TA group.

Hereinafter, a description will be given of an RRC state of a UE and an RRC connection method.

The RRC state means whether an RRC layer of the UE is logically connected to that of the E-UTRAN. If the RRC layer of the UE is logically connected to that of the E-UTRAN, it is called an RRC_CONNECTED state. If the RRC layer of the UE is not logically connected to that of the E-UTRAN, it is called an RRC_IDLE state.

If a UE is in the RRC_CONNECTED state, the E-UTRAN can check existence of the UE in a cell unit and thus control the UE effectively. On the other hand, if a UE is in the RRC_IDLE state, the E-UTRAN cannot check existence of the UE. Thus, the UE needs to be managed by a CN in a TA unit, which is an area unit greater than a cell. That is, the UE in the RRC_IDLE state should transition to the RRC_CONNNECTED state to receive services such as voice or data from a cell.

When a user initially turns on a UE, the UE first searches for a proper cell and then stays in the RRC_IDLE state in the corresponding cell. If the UE staying in the RRC_IDLE state needs to establish RRC connection, the UE performs an RRC connection establishment procedure with respect to the RRC layer of the E-UTRAN and then transition to the RRC_CONNECTED state. The UE staying in the RRC_IDLE state needs to establish the RRC connection in many cases. For example, the cases may include a case where UL data needs to be transmitted for a reason such as a call attempt made by a user and a case where a response message needs to be transmitted in response to a paging message received from the E-UTRAN.

Figure 15:
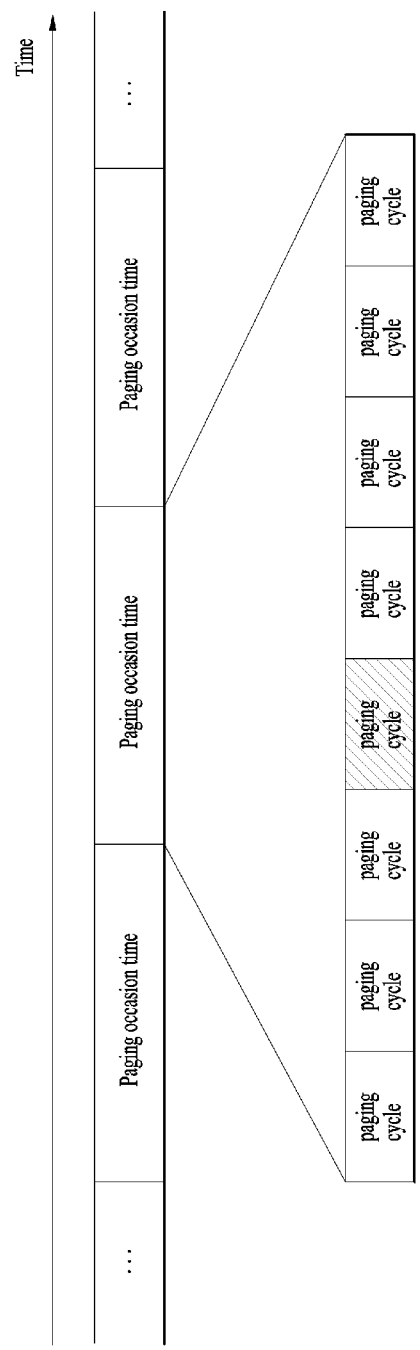
FIG. 15 is a diagram for explaining a general transmission and reception method using a paging message.

FIG. 15 is a diagram for explaining a general transmission and reception method using a paging message.

Referring to FIG. 15, the paging message includes a paging record including a paging cause and a UE identity. When the paging message is received, a UE may perform discontinuous reception (DRX) for the purpose of reducing power consumption.

More specifically, a network configures several paging occasions (POs) in every time cycle called a paging DRX cycle, and a specific UE receives only a specific paging occasion and thus acquires a paging message. The UE does not receive a paging channel in other occasions except the specific occasion and may be in a sleep state to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI)) as the PI and inform the UE of paging information transmission. For example, the UE awakes in every DRX cycle and receives one subframe in order to check whether a paging message is received. If a P-RNTI is present in an L1/L2 control channel (PDCCH) of a received subframe, the UE may confirm that the paging message is present in a PDSCH of the subframe. In addition, if the identity (e.g., IMSI) of the UE is present in the paging message, the UE responds to the eNB (e.g., receives RRC connection or system information) and thus receives a service from the eNB.

Next, system information will be described. The system information includes information necessary for a UE to connect to an eNB. Accordingly, the UE should receive all system information before being connected to the eNB and always have new system information. Since all UEs in a cell should know system information, the eNB periodically transmits the system information.

The system information may be categorized as a master information block (MIB), a scheduling block (SB) and a system information block (SIB). The MIB enables a UE to become aware of a physical configuration of a cell, for example, a bandwidth. The SB indicates transmission information of SIBs, for example, a transmission period. The SIB is a set of associated system information. For example, a specific SIB includes only information on neighboring cells and another SIB includes only information on a UL radio channel used by a UE.

Hereinafter, cell selection and cell reselection processes will be described.

If a UE is powered on, the UE selects a cell with an appropriate quality and performs preparation procedures for receiving a service. A UE in the RRC_IDLE state should always select a cell with an appropriate quality and prepare to receive a service from the cell. For example, a UE which is just turned on should select a cell with an appropriate quality to register a network. If a UE in the RRC_CONNECTED state enters the RRC_IDLE state, the UE should select a cell on which the UE will stay in while maintaining the RRC_IDLE state. A process performed by a UE for selecting a cell satisfying a specific condition to stay therein in a service waiting state such as the RRC_IDLE state is referred to as cell selection. Since the cell selection is performed in a state in which the UE does not determine a cell where the UE stays in the RRC_IDLE state, it is important to select a cell as quickly as possible. Accordingly, if a cell provides a radio signal quality equal to or greater than a predetermined level, the cell may be selected in the cell selection process of the UE although the cell does not provide the best radio signal quality to the UE.

If the UE selects the cell satisfying the cell selection reference, the UE receives information necessary for the UE to operate in the RRC_IDLE state within the cell from system information of the corresponding cell. After receiving all information necessary for the UE to operate in the RRC IDLE state, the UE requests a service to the network or waits in the RRC_IDLE state to receive a service from the network.

After selecting a certain cell in the cell selection process, the strength or quality of a signal between a UE and eNB may be changed due to mobility of the UE or a change in the wireless environment. That is, if the quality of the selected cell is degraded, the UE may select another cell which provides a better quality. When the UE intends to reselect a cell, the UE generally selects a cell which provides a signal quality higher than that of the currently selected cell. Such a process is referred to as cell reselection. The basic purpose of the cell reselection process is to select a cell that provides the best quality to the UE in terms of the radio signal quality. Besides the radio signal quality, the network may establish priority of frequency and then inform the UE of the priority. After receiving the priority, the UE preferentially considers the priority than the radio signal quality.

In the following description, MBMS (multimedia broadcast multicast service) is explained. First of all, MBMS (multimedia broadcast multicast service) is a kind of a broadcast/multicast service and is the service for transmitting multimedia data packets to a plurality of user equipments simultaneously. 'Broadcast/multicast service' or/MBMS' used in the present disclosure can be substituted with such a terminology as 'point-to-multipoint service', 'MBS (multicast and broadcast service)' and the like. In the MBMS based on IP multicast, user equipments share a resource required for data packet transmission with each other and then receive the same multimedia data. Hence, in case that user equipments on a predetermined level using MBMS exist in the same cell, it is able to raise resource efficiency. Since the MBMS has no relation with an RRC connected state, a user equipment in an idle state is able to receive the corresponding service.

A logical channel MCCH (MBMS control channel) or MTCH (MBMS traffic channel) for MBMS can be mapped to a transport channel MCH (MBMS channel). The MCCH carries an RRC message containing MBMS related common control information, while the MTCH carries a traffic of a specific MBMS service. A single MCCH exists in a single MBSFN (MBMS single frequency network) area to carry the same MBMS information or traffic. In case that a plurality of MBSFN areas are provided by a single cell, a user equipment may be able to receive a plurality of MCCHs.

Meanwhile, the introduction of evolved-MBMS (E-MBMS) has been discussed in the LTE-A system. Hereinafter, evolved-MBMS is referred to as E-MBMS. The E-MBMS is an evolved model of the MBMS, which is initially defined in UMTS in Release 6, and multiple multimedia services can be provided to a user through the E-MBMS.

The E-MBMS can be divided in two types. The first one is based on multi-cell transmission in a dedicated frequency layer or shared frequency layer, and it is referred to as MBSFN (Multi-Media Broadcast over a Single Frequency Network). In addition, the MBSFN could be interpreted to mean that a plurality of cell simultaneously transmit the same data based on reference signals and formats configured to properly combine signals transmitted from the plurality of cells. In this case, for the E-MBMS, the plurality of cells may transmit data using reference signals and formats different from those for unicast.

The second one is based on single-cell transmission in a shared frequency layer, and it is referred to as SC-PTM (Single Cell Point to Multipoint). In this case, for the E-MBMS, a single cell transmit data using reference signals and formats similar to those used in the conventional unicast transmission.

The present invention proposes a method performed by a UE for performing feedback in uplink to assist a network in performing E-MBMS transmission where the network transmits the same data to a plurality of UEs in downlink. Further, the invention also proposes a method for enabling coexistence of E-MBMS transmission and unicast transmission where data is transmitted to a single UE.

In this case, the E-MBMS can be implemented such that a single cell transmits data using reference signals and formats similar to those used in the conventional unicast transmission. This is referred to as SC-PTM (Single Cell Point-To-Multipoint). Alternatively, the E-MBMS can be implemented such that a plurality of cells transmit data using reference signals and formats different from those for unicast. In particular, the E-MBMS can be implemented such that a plurality of cell simultaneously transmit the same data based on reference signals and formats configured to properly combine signals transmitted from the plurality of cells, and it is referred to as MBSFN (Multicast and Broadcast in Single Frequency Network).

As described above, an E-MBMS signal is transmitted to a plurality of UEs. A UE that receives the E-MBMS signal may be connected to the network (such a UE is referred to as an RRC_CONNECTED UE), but a UE that is not connected to the network may also receive the E-MBMS signal (such a UE is referred to as an RRC_IDLE UE). Hereinafter, the former UE is named an RRC_CONNECTED UE or a UE in the RRC_CONNECTED state, and the latter UE is named an RRC_IDLE UE or a UE in the RRC_IDLE state. If a UE that does not have any traffic to be transmitted or received in unicast performs processes for maintaining the connection to the network for E-MBMS reception, it may be considered as significant signaling overhead from the perspective of the network. In addition, from the perspective of the UE, it may be considered as unnecessary battery consumption.

Meanwhile, in the case of the E-MBMS, if a UE provides proper feedback in UL, overall performance can be improved. As an example of the feedback, ACK/NACK informing whether an E-MBMS message is correctly received can be considered. That is, each UE may transmit, to the eNB, UL feedback for informing whether a specific message is successfully received. When some of UEs that are supposed to perform reception feed back reception failure, the network may transmit a corresponding message to enable all UEs supposed to receive the message to perform stable reception.

As another example of the feedback, CSI for the E-MBMS can be considered. When transmitting each E-MBMS message, the network determines an appropriate modulation and coding scheme (MCS) for the transmission. To this end, each UE feeds back an MCS level capable of stably receiving the E-MBMS message, and the network may transmit the message using an MCS level that enables a large portion of UEs to perform stable reception.

In the present invention, a method performed by a UE for performing feedback for the E-MBMS is proposed. Particularly, a feedback method performed by a UE in the RRC_IDLE state and a method for performing feedback for the E-MBMS in consideration of a relationship with a unicast signal will be described.

The RRC_CONNECTED UE can easily perform the above-described UL feedback. This is because since the corresponding UE is already connected to the network, the UE can receive information on various transmission from the eNB. In particular, since the corresponding UE receives a proper timing advance (TA) from the eNB and then uses the received TA, signals transmitted from a plurality of UEs are properly arrived at the eNB irrespective of distances between the UEs and eNB. Thus, the UE can receive signals from the eNB in a state in which the amount of mutual interference is sufficiently small. However, since the RRC_IDLE UE does not have such a TA, the UE has difficulties in transmitting UL feedback.

Hereinafter, a method for enabling an RRC_IDLE UE to efficiently transmit feedback will be described. Particularly, the invention will be described with reference to an example in which the RRC_IDLE UE performs feedback for the E-MBMS.

As an embodiment of the present invention, when the RRC_IDLE UE performs UL feedback transmission for the E-MBMS, the UE may not use a separate TA. That is, the unused separate TA could be interpreted UE-specifically to mean that a TA allocated to a specific UE is not used. Additionally, it may imply that a TA applied to UL transmission is set to a prescribed value. Further, it may mean that the TA applied to the UL transmission is set to a common value for all UEs that can participate in the corresponding transmission. Referring back to FIG. 14, UL transmission timing according to an embodiment of the transmission is described. FIG. 14 shows UL transmission timing in the LTE system.

Referring to FIG. 14, transmission of UL radio frame #i may be started $(N_{TA}+N_{TAoffset}) \times T_s$ seconds before the start of a corresponding DL radio frame. When the RRC_IDLE UE performs UL feedback for E-MBMS reception, the value of $N_{TA}$ may be set to a specific value. This value may be predetermined. In particular, when this value is set to 0, it could be interpreted to mean that the UL feedback is transmitted using DL reception timing.

Alternatively, the network may transmit, to a UE, signaling for setting the value of $N_{TA}$ to a specific value by considering a TA value of the normal UE. Especially, in the present embodiment, since the exiting $N_{TAoffset}$ value is maintained, a transmission time of the UL feedback signal may be changed compared to DL frame standards of the FDD frame structure and TDD frame structure.

As another method of using the transmission timing in the LTE system, when the RRC_IDLE UE performs the UL feedback, the entirety of $N_{TA}+N_{TAoffset}$ can be set to a specific value. In this case, the corresponding value can be predetermined, for example, as zero. Alternatively, the network may configure the value through signaling.

As another embodiment of the present invention, a signal format that can be used when an RRC_IDLE UE performs feedback will be hereinafter described.

As an example of the signal format for transmitting the UL feedback signal, the conventional PUSCH or PUCCH can be used, or the PUSCH or PUCCH can be modified.

In this case, it is difficult to properly multiplex the PUSCH or PUCCH transmitted from the RRC_IDLE UE with a general PUSCH or PUCCH transmitted from the RRC_CONNECTED UE. This is because whether the eNB can control them through the TA is different in the two cases.

Thus, for the PUSCH or PUCCH transmitted by the RRC_IDLE UE as the UL feedback, it is proposed to use separate resources, which are different from resources for the PUSCH or PUCCH. In this case, the PUCCH and PUSCH for the RRC_CONNECTED UE or unicast UE are referred to as a legacy-PUCCH (L-PUCCH) and a legacy-PUSCH (L-PUSCH), and the PUCCH and PUSCH for the RRC_IDLE UE is referred to as an A-PUCCH and an A-PUSCH. Preferably, a proper frequency gap is configured between two resources, i.e., between the L-PUSCH and/or L-PUCCH and the A-PUSCH and/or A-PUCCH. According to this structure, it is possible to cancel interference between two unsynchronized signals.

In addition, a CP length, which is different from that of the L-PUSCH or L-PUCCH for the RRC_CONNECTED UE, can be applied to the A-PUSCH or A-PUCCH transmitted from the RRC_IDLE UE. In the case of the PUSCH or PUCCH transmitted from the RRC_IDLE UE, since the TA is not applied per UE, a significant time error may occur until it reaches the eNB. In consideration of this, the CP length of the A-PUSCH and/or A-PUCCH transmitted from the RRC_IDLE UE may be longer than that of the L-PUSCH and/or L-PUCCH. This could be interpreted to mean that the network fixes the CP length of the PUSCH/PUCCH transmitted from the RRC_IDLE UE to an extended CP length. Alternatively, the network may configure a CP length different from the UL CP length for unicast.

For the transmission of the UL feedback signal, the aforementioned PRACH process can be used.

As another example of the signal format for transmitting the UL feedback signal, a PRACH preamble can be used. Considering that the PRACH preamble is a signal used by a UE to initially access to the network, the RRC_IDLE UE can also transmit the PRACH preamble. Therefore, UL feedback information for the E-MBMS can be transmitted through the PRACH preamble.

For example, when failing to receive a specific E-MBMS message, a UE may transmit a time/frequency resource and a PRACH preamble sequence associated with the reception failure. On the contrary, when successfully receiving the specific E-MBMS message, the UE may transmit a time/frequency resource and a PRACH preamble sequence associated with the reception success.

In this case, a single time/frequency resource and/or a single PRACH preamble may be associated with the message reception failure and/or success.

Alternatively, to reduce the number of cases where different UEs select the same resource and preamble, a plurality of resources or preambles may be configured regarding the reception failure and/or success, and a UE may be configured to select one of them and then perform transmission.

As another example of using the RACH process, a UE that intends to perform CSI feedback first transmits the PRACH preamble on a predetermined time/frequency resource. Thereafter, when the eNB allocates a PUSCH transmission resource based on the PRACH process using the PRACH preamble, the UE may transmit CSI for the E-MBMS using the corresponding PUSCH resource. In this case, as an example of the CSI, CSI calculated by considering a transmission scheme of the E-MBMS, a precoding scheme, a power boosting level, and/or a target BLER can be used separated from unicast.

In the above operation, the PRACH preamble transmitted by the UE may be a preamble reserved for feedback defined in resources, which are separately reserved for CSI feedback for the E-MBMS for the RRC_IDLE UE.

In this case, to reduce the number of cases where a plurality of UEs transmit the same preamble on the same resource, a plurality of resources and/or preambles may be configured, and a UE may select one of them and then perform transmission.

To this end, eNB signaling for allocating the PUSCH resources can include an indicator indicating whether the CSI to be reported by the UE is for the unicast or E-MBMS. When an indicator indicating the E-MBMS is included, the CSI for the E-MBMS may be reported on the corresponding PUSCH resources.

Alternatively, when the UE receives a random access response message indicating CSI reporting after transmitting the reserved PRACH preamble on the resources reserved for feedback, the UE may be configured to report the CSI for the E-MBMS.

As another embodiment, an operation of transmitting ACK/NACK using the PRACH preamble and an operation of feeding back CSI through the PUSCH in the RACH process may be combined. For example, when a UE fails to receive a message, the UE transmits a PRACH preamble for informing NACK. Thereafter, when the eNB transmits a random access response message in response to the PRACH preamble and allocates a PUSCH transmission resource, the UE may feed back CSI through the corresponding PUSCH resource.

When a PRACH preamble for informing ACK is transmitted, the same operation can be performed. However, in this case, since the UE has a good channel state enough to receive the message correctly, the UE may not need to feed back its CSI. Thus, the UE may not attempt to receive the random access response message from the eNB. Alternatively, the UE may feed back whether the UE successfully receives an E-MBMS message or not by using the PUSCH resources allocated through the PRACH process for the CSI feedback.

Hereinafter, the invention will be described by taking as an example of the CQI. That is, in this case, a CQI for the E-MBMS may be transmitted. Particularly, in the MBSFN where a plurality of cells perform transmission, a CQI for the plurality of cells are different from the conventional CQI for each individual cell. More particularly, a CQI measured based on an RS transmitted through a PBCH or in the MBSFN can be transmitted.

When the RRC_IDLE UE performs the UL feedback according to the above-described method, it can be advantageous for the RRC_CONNECTED UE to use the same method. This is because the eNB can receive feedback using a single method regardless of whether the UE is in the RRC_IDLE state or RRC_CONNECTED state. In other words, irrespective of the RRC_IDLE state or RRC_CONNECTED state, the PUSCH/PUCCH transmitted from the UE that receives the E-MBMS can be considered as the A-PUSCH/A-PUCCH, and the PUSCH/PUCCH used by the unicast UE can be considered as the L-PUSCH/L-PUCCH. However, in this case, if a PUSCH/PUCCH with no UE-dedicated or UE-specific TA is used as the feedback of the RRC_IDLE UE, UL transmission for unicast may collide with that for the RRC_CONNECTED UE as shown in FIG. 16.

Figure 16:
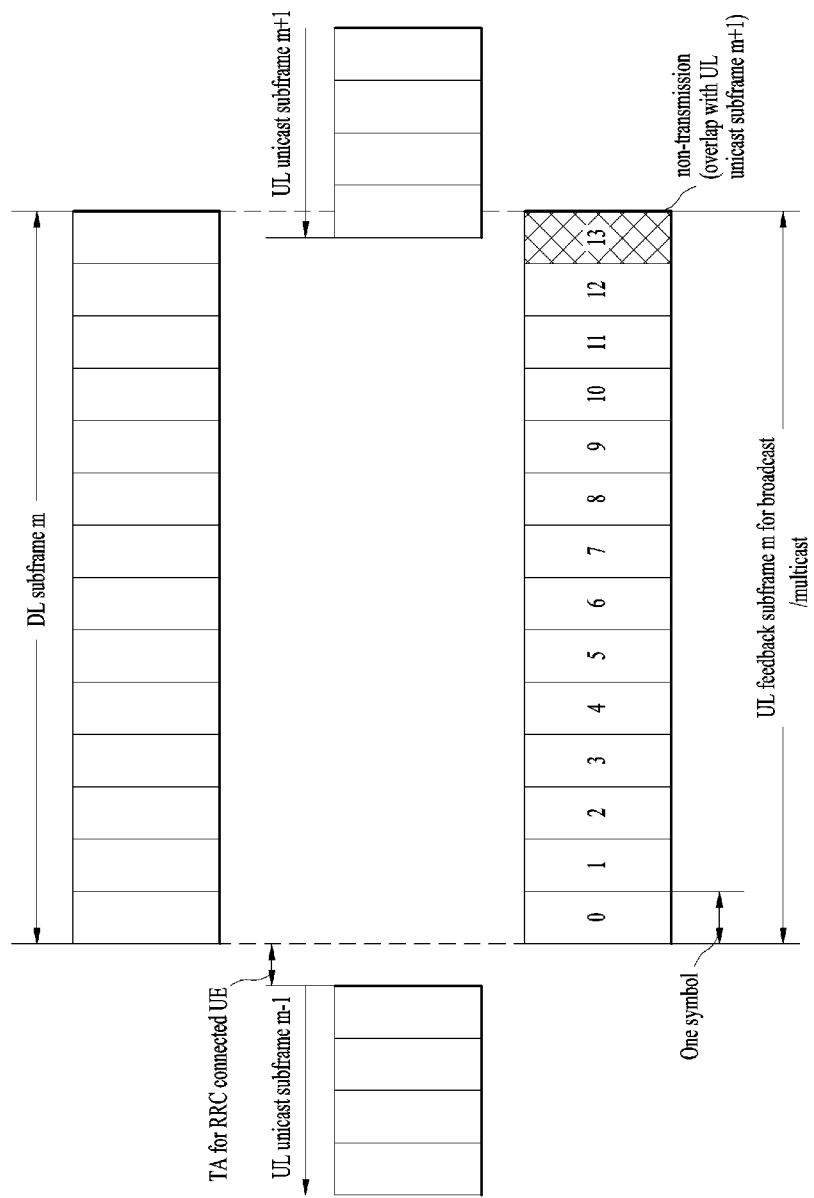
FIG. 16 is a diagram for explaining a method for solving an overlap between subframes as an embodiment of the present invention.

FIG. 16 is a diagram for explaining UE operation according to a timing advance as an embodiment of the present invention. Hereinafter, a description will be given of UE operation when an overlap between subframes occurs with reference to FIG. 16.

Referring to FIG. 16, in subframe m, a UE does not use a TA but transmits UL feedback. On the other hand, in subframe m+1, it is assumed that the UE performs unicast transmission to which the TA is applied. In this case, an overlap between subframes occur. In other words, an overlap between symbols occurs in each subframe.

To avoid this overlap, in the case of UL feedback for the E-MBMS where the TA is not used, a part of the last symbol of a subframe may not be used for transmission. For example, the last symbol may not be used for transmission. Alternatively, an eNB may configure the number of symbols excluded from the transmission by considering the UE's TA.

Meanwhile, as described above, the feedback operation of the RRC_IDLE UE can act as interference to a network due to the TA non-application or the different CP length. If it is determined that such an interference problem is serious, it is preferred that the network does not allow the feedback operation.

That is, the eNB can inform whether the RRC_IDLE UE is allowed to perform the UL feedback for the E-MBMS through, for example, broadcast control signaling. For example, if a resource for the UL feedback for the E-MBMS is not allocated to the RRC_IDLE UE, the RRC_IDLE UE may consider that this operation is not allowed.

When the eNB operates based on only feedback from the RRC_CONNECTED UE while not allowing the E-MBMS of the RRC_IDLE UE, performance of the RRC_IDLE UE can be significantly degraded. For example, the RRC_IDLE UE may receive an E-MBMS message in a place where the signal quality from the eNB is extremely low. However, if the eNB determines whether to perform retransmission or an MCS configuration based on feedback from the RRC_CONNECTED UE located in a place where the signal quality is excellent, the reception performance of the RRC_IDLE UE will be significantly degraded. The RRC_IDLE UE in this situation is preferred to establish the RRC connection and participate in the feedback for the E-MBMS.

For example, if a message decoding error observed during a prescribed time is equal to or greater than a predetermined level, if a broadcast/unicast message, received power of a reference signal, and/or SINR is equal to or smaller than a predetermined level, or if RSRP and/or RSRQ from the eNB that transmits the broadcast/unicast message is equal to or smaller than a predetermined level, the RRC_IDLE UE receiving the E-MBMS message may be regulated to attempt the RRC connection. The eNB may configure these standards through a broadcast control signal. In this case, the broadcast/unicast message may mean a broadcast message and/or a unicast message. Further, the broadcast message may be used as the concept for indicating the E-MBMS.

As a modified example of the above-described operation, only when the RRC_IDLE UE satisfies the aforementioned conditions, the RRC_IDLE UE can be configured to perform ACK/NACK and/or CSI feedback. That is, if the message decoding error observed during the prescribed time is equal to or greater than the predetermined level, if the broadcast/unicast message, the received power of the reference signal, and/or the SINR is equal to or smaller than the predetermined level, or if the RSRP and/or RSRQ from the eNB that transmits the broadcast/unicast message is equal to or smaller than the predetermined level, the RRC_IDLE UE may be configured to perform the feedback. This is to prevent a case in which the RRC_IDLE UE having a sufficiently good channel state participates in the feedback operation and thus causes interference.

Whether an eNB allows an RRC_IDLE UE to perform UL feedback may be changed in each cell. For example, in a cell with a small number of E-MBMS receiving UEs, all UEs may be configured to operate in a connected mode and transmit UL feedback in the connected state. Hereinafter, a cell where the number of receiving UEs is small is referred to as a first cell.

On the other hand, in a cell with a large number of E-MBMS receiving UEs, if all UEs are maintained in the connected mode, the cell may be overburdened. Thus, the UL feedback of the RRC_IDLE UE can be allowed or E-MBMS reception without feedback may be performed. Hereinafter, a cell where the number of receiving UEs is large is referred to as a second cell.

In this case, each cell can inform a UE whether feedback is allowed in the RRC_IDLE mode, whether specific E-MBMS is operated based on feedback, and/or whether there is a restriction that a UE receiving specific E-MBMS should operate in the RRC_CONNECTED mode. Preferably, each cell can use broadcast control signal to inform the above information.

For example, in case a UE receiving the E-MBMS in the RRC_IDLE mode in the first cell is handed over to the second cell, if the UE recognizes that the second cell does not allow feedback of the RRC_IDLE UE, the UE may be configured to establish the RRC connection with the second cell and perform UL feedback. On the other hand, if the UE recognizes that the second cell allows the feedback of the RRC_IDLE UE, the UE can maintain the IDLE state.

The above-described operation regarding the RRC_IDLE UE can be further extended. That is, the RRC_IDLE UE may be considered as a UE that does not have a stable TA. For example, in case a specific UE does not perform UL transmission in which a TA is used during a long time and/or does not receive a TA command from the eNB during a long time even though the UE is in the RRC_CONNECTED state, if the UE transmits a signal using the current TA, the eNB may not receive the signal correctly. In this case, that is, in the case of the UE having the non-stable TA, the UE may be configured not to use the TA like the RRC_IDLE UE but to transmit a UL feedback signal for the E-MBMS.

Hereinafter, when a specific UE should perform UL transmission for unicast while transmitting UL feedback for the E-MBMS, a method performed by the specific UE for efficiently multiplexing them will be proposed. Specifically, the method will be described in terms of priority between signals, power control, and soft buffering.

First, a method of determining priority between E-MBMS and unicast signals will be described.

While a specific UE transmits the UL feedback for the E-MBMS, the specific UE should perform the UL transmission for the unicast, for example, the UE needs to transmit HARQ-ACK for a unicast PDSCH, periodic CSI feedback for a unicast PUSCH and other unicast channels, a sounding reference signal, a scheduling request (SR), and the like.

In general, there may be difficulties in implementing a UE capable of simultaneously transmitting two different channels in a single subframe. When a UE needs to transmit two signals at the same time, the UE may be configured to transmit one of them depending on capability of the UE. In this case, priority can be determined according to one of the following methods.

Method 1: Priority is determined between transmission for unicast and UL feedback for E-MBMS.

Method 1-1: The transmission for the unicast is prioritized. That is, the UL feedback for the E-MBMS is dropped and the transmission for the unicast is performed.

Method 1-2: The UL feedback for the E-MBMS is prioritized. In particular, this operation is efficient when important traffic, for example, voice communication in an emergency situation is transmitted.

Method 1-3: The network determines the priority therebetween.

Method 2: Priority is determined based on properties of transmitted signals.

Method 2-1: In terms of a UL feedback signal, a signal indicating success or failure of message reception is prioritized over CSI reporting.

Method 2-2: In terms of a signal for unicast transmission, transmission dynamically scheduled through a (E)PDCCH is prioritized over semi-statically scheduled transmission.

As another example, the aforementioned method can be combined with each other. That is, method 1 can be applied to signals with the same properties and method 2 can be applied to signals with different properties. More particularly, according to method 1-1, the unicast transmission is prioritized in the case of the same properties and method 2 can be applied to the different properties. As a result, HARQ-ACK for a PDSCH scheduled through a (E)PDCCH can be prioritized over a unicast message or feedback on success or failure of E-MBMS message reception but the unicast message or the feedback on the success or failure of the E-MBMS message reception can be prioritized over periodic CSI reporting for unicast. In other words, the prioritized may be determined in the following order: the HARQ-ACK for the PDSCH dynamically scheduled by the (E)PDCCH, the unicast message and/or the feedback on the success or failure of the E-MBMS message reception, and the periodic CSI reporting.

If a UE is able to simultaneously transmit two channels, according to the priority order determined based on the above-described method, power is first allocated to a channel with higher priority first, and the remaining power may be allocated to a channel with lower priority.

Hereinafter, a description will be given of a method for controlling transmit power of UL feedback for E-MBMS.

In general, UL transmission at the UE is managed by the eNB through closed loop power control. That is, if receive power is too high, the eNB instructs to decrease transmit power. On the contrary, if receive power is too low, the eNB instructs to increase transmit power.

Meanwhile, if a plurality of UEs transmit feedback signals by sharing the same channel to provide feedback for broadcast/unicast, the strength of a received signal varies depending on the number of UEs participating in the transmission. In this case, it is difficult to adjust transmit power and thus, the closed-loop power control may not be performed correctly.

For example, if a plurality of UEs share a specific resource and only UEs that fails to receive an E-MBMS message transmit feedback signals using the corresponding resource, receive power at the eNB may be changed according to the number of transmitting UEs. As a result, the eNB has difficulties in performing power control for the feedback signals based on the receive power. However, considering that transmit power of each UE needs to be stably arrived at the eNB, the power control should be performed.

As an embodiment, transmit power of the feedback signal for the broadcast/unicast can be configured by adding a predetermined offset to transmit power of the unicast PUCCH or PUSCH, which has been already power-controlled in an individual manner. Here, the offset is to compensate a difference between a process for demodulating the feedback signal for the broadcast/unicast at the eNB and a demodulation process for the unicast.

As described above, if a UE that successfully receives the E-MBMS message does not transmit the feedback signal and a UE that fails to receive the E-MBMS message transmits the feedback signal, the eNB should determine the success or failure of the message reception based on the magnitude of receive power on a corresponding resource. In this case, to maintain the probability of making a successful decision at the same level as when individual signals are transmitted to indicate success and failure of unicast PDSCH reception, higher receive power is required. That is, for the higher power, the offset is added to the transmit power of the signal indicating the success or failure of the E-MBMS reception compared to that indicating the success or failure of the unicast PDSCH reception.

Hereinafter, soft buffering will be described.

When a UE fails to decode received data, the UE stores related information in a buffer. Thereafter, if the corresponding data is retransmitted, the UE can attempt decoding with a higher success probability by combining the corresponding data with the stored information. This is called the soft buffering. If a broadcast/unicast signal is retransmitted, it is preferred to perform the soft buffering, and in this case, it should be determined how a UE shares a limited soft buffer for a unicast PDSCH. That is, the UE should store the predetermined minimum amount of data of the received data in the softer buffer, and the eNB needs to know the corresponding fact to determine the amount of retransmission necessary for the UE.

Method 1: A partial space of the soft buffer allocated for an HARQ process for the unicast PDSCH is utilized for the E-MBMS.

Method 2: A part of the soft buffer is allocated for the E-MBMS. Thereafter, the remaining part is divided according to the number of existing unicast PDSCH HARQ processes and each divided part is allocated for each unicast PDSCH.

Method 3: There is no soft buffer separately allocated for the E-MBMS. That is, if there is an available space in the soft buffer, data is stored in the buffer. Specifically, if there is an available space in the soft buffer after the minimum amount of data required for the unicast PDSCH is stored, data for the E-MBMS is stored. However, if there is no available space, the data for the E-MBMS is discarded instead of being stored. This may imply that the unicast PDSCH has higher priority than the E-MBMS in the soft buffering.

Figure 17:
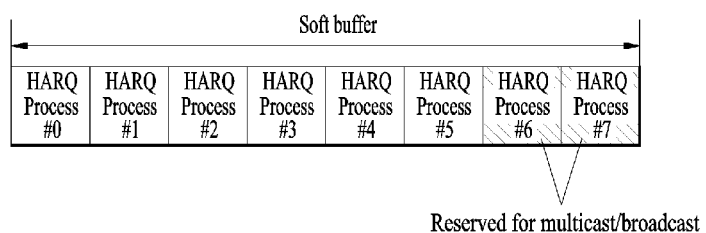
FIG. 17 illustrates an example for explaining a method for enabling coexistence of a unicast message and an E-MBMS feedback message according to the present invention.
Figure 18:
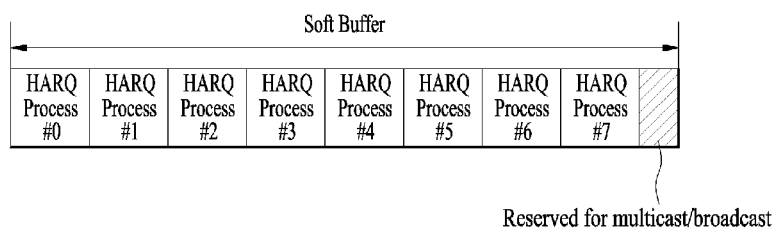
FIG. 18 illustrates another example for explaining a method for enabling coexistence of a unicast message and an E-MBMS feedback message according to the present invention.
Figure 19:
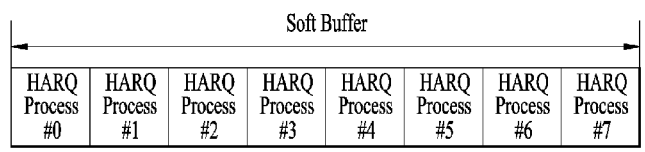
FIG. 19 illustrates a further example for explaining a method for enabling coexistence of a unicast message and an E-MBMS feedback message according to the present invention.

FIGS. 17 to 19 illustrates methods for performing soft buffering as a further embodiment of the present invention. Each of the drawings respectively shows operations according to methods 1, 2, and 3 when there are eight DL HARQ processes. Hereinafter, each of the methods will be described with reference to FIGS. 17 to 19.

Referring to FIG. 17, a part of the soft buffer, which corresponds to two HARQ processes, is used for the E-MBMS. Thus, when a UE fails packet reception during six DL HARQ processes, the UE performs soft buffering with respect to minimum bits. On the other hand, when the UE fails packet reception during more than the six DL HARQ processes, the UE may not store soft bits of some HARQ processes in a state in which E-MBMS bits are stored. This method can be efficiently used in storing a number of bits of many E-MBMS packets.

Referring to FIG. 18, a part of the soft buffer is allocated for the E-MBMS according to method 2. In FIG. 18, even when the UE fails packet reception during all of the eight DL HARQ processes and stores packets, the UE stores minimum bits of a packet that the UE fails to receive in the E-MBMS in the soft buffer. This method can be efficiently used in storing a number of bits of less E-MBMS packets.

FIG. 19 shows a case in which the unicast PDSCH has higher priority than the E-MBMS according to method 3. That is, FIG. 19 shows a state in which each HARQ process is allocated for the unicast PDSCH as in the related art.

In FIG. 19, from the perspective of the DL HARQ process, the operation is performed in the same way as in the related art. That is, when packet errors occur during all of the eight DL HARQ processes, the predefined minimum bits are stored in the soft buffer with respect to all the processes. Although not shown in FIG. 19, when packet errors do not occur during some processes, soft buffers of the corresponding processes will be temporarily empty, and bits of the E-MBMS packet can be stored therein. As described above, this method can be efficiently used in giving high priority to unicast buffering.

Figure 20:
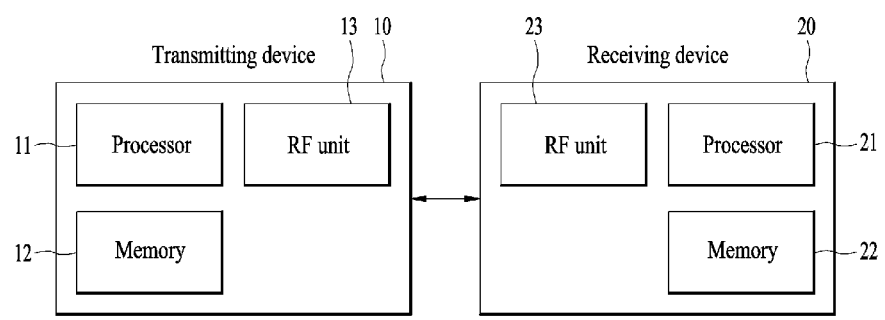
FIG. 20 is a block diagram illustrating elements of a transmitting device 10 and a receiving device 20 for implementing the present invention.

FIG. 20 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGA's) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The above eNB processor and UE processor may be configured in such a manner that the above-described various embodiments of the present invention may be implemented independently or in combination of two or more.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method for performing feedback for an Evolved-Multimedia Broadcast Multicast Service (E-MBMS) by a user equipment (UE) in a wireless communication system, the method comprising:
receiving the E-MBMS from a base station (BS); and
transmitting acknowledgement/negative-acknowledgement (ACK/NACK) information on the E-MBMS in a physical random access channel (PRACH) preamble in a subframe m where a TA (timing advance) is not used;
receiving, from the BS, information on allocating physical uplink shared channel (PUSCH) resources in response to the PRACH preamble, wherein the information includes an indicator indicating whether channel state information (CSI) is for unicast or the E-MBMS;
reporting the CSI on the PUSCH resources when the indicator indicates the E-MBMS is included; and
performing a unicast transmission to which the TA is applied in a subframe m+1;
wherein a sequence of the PRACH preamble in which the ACK/NACK information is transmitted is determined based on whether the E-MBMS is successfully received,
wherein the PRACH preamble is a preamble reserved in resources which are separately reserved for the CSI for the E-MBMS,
wherein a number of symbols at the end of subframe m are not used for transmission of the ACK/NACK information, and
wherein the number of symbols is determined based on the TA.

2. The method of claim 1, wherein a cyclic prefix (CP) length of the subframe m is set to a value different from that of an uplink subframe in which a UE in an RRC connected state transmits a physical uplink shared channel (PUSCH) or a physical uplink control channel (PUCCH).

3. The method of claim 1, wherein a resource for the PRACH preamble in which the ACK/NACK information is transmitted is associated with the ACK/NACK information.

4. The method of claim 3, wherein the resource for the PRACH preamble associated with the ACK/NACK information is a single time-frequency resource.

5. The method of claim 3, wherein the ACK/NACK information is associated with a plurality of time-frequency resources, and wherein the resource for the PRACH preamble is selected from among the plurality of time-frequency resources.

6. The method of claim 1, further comprising:
transmitting the PRACH preamble to the BS using a resource dedicated to an RRC idle UE receiving the E-MBMS.

7. A method for receiving feedback for an Evolved-Multimedia Broadcast Multicast Service (E-MBMS) by a base station (BS) in a wireless communication system, the method comprising:
transmitting the E-MBMS to a user equipment (UE);
receiving acknowledgement/negative-acknowledgement (ACK/NACK) information on the E-MBMS in a physical random access channel (PRACH) preamble in a subframe m where a TA (timing advance) is not used;

transmitting information on allocating physical uplink shared channel (PUSCH) resources in response to the PRACH preamble, wherein the information includes an indicator indicating whether channel state information (CSI) is for unicast or the E-MBMS;

receiving the CSI on the PUSCH resources when the indicator indicates the E-MBMS is included; and performing a unicast transmission to which the TA is applied in a subframe m+1;

wherein a sequence of the PRACH preamble in which the ACK/NACK information is received is determined based on whether the E-MBMS is successfully received by the UE, wherein the PRACH preamble is a preamble reserved in resources which are separately reserved for the CSI for the E-MBMS, wherein a number of symbols at the end of subframe m are not used for transmission of the ACK/NACK information, and wherein the number of symbols is determined by the eNB based on the TA.

8. A user equipment (UE) in a wireless communication system, the UE comprising:

a transceiver configured to:

receive an Evolved-Multimedia Broadcast Multicast Service (E-MBMS) from a base station (BS);

transmit acknowledgement/negative-acknowledgement ACK/NACK information on the E-MBMS in a physical random access channel (PRACH) preamble in a subframe m where a TA (timing advance) is not used;

receive, from the BS, information on allocating physical uplink shared channel (PUSCH) resources in response to the PRACH preamble, wherein the information includes an indicator indicating whether channel state information (CSI) is for unicast or the E-MBMS; and transmit the CSI on the PUSCH resources when the indicator indicates the E-MBMS is included, a processor configured to control the transceiver to perform a unicast transmission to which the TA is applied in a subframe m+1, wherein the processor determines a sequence of the PRACH preamble in which the ACK/NACK information is transmitted is determined based on whether the E-MBMS is successfully received, wherein the PRACH preamble is a preamble reserved in resources which are separately reserved for the CSI for the E-MBMS, wherein a number of symbols at the end of subframe m are not used for transmission of the ACK/NACK information, and wherein the number of symbols is determined based on the TA.

9. A base station (BS) in a wireless communication system, the BS comprising:

a transceiver configured to:

transmit an Evolved-Multimedia Broadcast Multicast Service (E-MBMS) to a user equipment (UE)

receive acknowledgement/negative-acknowledgement ACK/NACK information on the E-MBMS in a physical random access channel (PRACH) preamble in a subframe m where a TA (timing advance) is not used;

transmit information on allocating physical uplink shared channel (PUSCH) resources in response to the PRACH preamble, wherein the information includes an indicator indicating whether channel state information (CSI) is for unicast or the E-MBMS; and receive the CSI on the PUSCH resources when the indicator indicates the E-MBMS is included, a processor configured to control the transceiver perform unicast transmission to which the TA is applied in a subframe m+1, wherein a sequence of the PRACH preamble in which the ACK/NACK information is received is determined based on whether the E-MBMS is successfully received by the UE, wherein the PRACH preamble is a preamble reserved in resources which are separately reserved for the CSI for the E-MBMS, wherein a number of symbols at the end of subframe m are not used for transmission of the ACK/NACK information, and wherein the number of symbols is determined based on the TA.

* * * * *